United States Patent
Tanaka et al.

(10) Patent No.: US 12,481,365 B2
(45) Date of Patent: Nov. 25, 2025

(54) TACTILE SENSE PRESENTATION DEVICE AND TACTILE SENSE PRESENTATION METHOD

(71) Applicant: Mitsubishi Electric Corporation, Tokyo (JP)

(72) Inventors: Koji Tanaka, Tokyo (JP); Mitsuru Sakai, Tokyo (JP); Ken Nagura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 85 days.

(21) Appl. No.: 18/573,437

(22) PCT Filed: Jul. 1, 2021

(86) PCT No.: PCT/JP2021/024964
§ 371 (c)(1),
(2) Date: Dec. 22, 2023

(87) PCT Pub. No.: WO2023/276113
PCT Pub. Date: Jan. 5, 2023

(65) Prior Publication Data
US 2024/0295926 A1  Sep. 5, 2024

(51) Int. Cl.
*H04B 3/36* (2006.01)
*G06F 3/01* (2006.01)
*G06F 3/044* (2006.01)

(52) U.S. Cl.
CPC .............. *G06F 3/016* (2013.01); *G06F 3/044* (2013.01)

(58) Field of Classification Search
CPC . G06F 3/016; G06F 3/044; G06F 3/01; G06F 3/041
See application file for complete search history.

(56) References Cited

U.S. PATENT DOCUMENTS

| 9,122,330 B2 * | 9/2015 | Bau ....................... G06F 3/0488 |
| 9,285,880 B2 * | 3/2016 | Araki ...................... G06F 3/016 |
| 10,908,693 B2 * | 2/2021 | Sasaki .................... G06F 3/0488 |
| 11,922,798 B2 * | 3/2024 | Ito ........................... G06F 3/016 |
| 2011/0090167 A1 | 4/2011 | Harris |

(Continued)

FOREIGN PATENT DOCUMENTS

| JP | 6032657 B2 | 11/2016 |
| JP | 6142928 B2 | 6/2017 |

(Continued)

OTHER PUBLICATIONS

International Search Report and Written Opinion mailed on Aug. 3, 2021, received for PCT Application PCT/JP2021/024964, filed on Jul. 1, 2021, 8 pages including English Translation.

*Primary Examiner* — Toan N Pham
(74) *Attorney, Agent, or Firm* — XSENSUS LLP

(57) ABSTRACT

A tactile sense presentation device calculates a first drive voltage signal by using a target vibration preset to correspond to a touch position and a vibration transfer characteristic up to the touch position through an actuator, and reduces components of a first frequency band of the first drive voltage signal less than a preset frequency to calculate a second drive voltage signal within a preset voltage range, whereby vibration presenting appropriate tactile stimulus to a user can be generated within the preset voltage range.

16 Claims, 13 Drawing Sheets

(56) References Cited

U.S. PATENT DOCUMENTS

| | | |
|---|---|---|
| 2014/0132568 A1 | 5/2014 | Hirose et al. |
| 2015/0153830 A1 | 6/2015 | Hirose et al. |
| 2016/0239089 A1 | 8/2016 | Taninaka et al. |
| 2022/0011865 A1 | 1/2022 | Nakao |
| 2022/0261082 A1* | 8/2022 | Haga .................... G06F 3/0446 |

FOREIGN PATENT DOCUMENTS

| | | |
|---|---|---|
| JP | 6183661 B2 | 8/2017 |
| JP | 2020-087073 A | 6/2020 |
| WO | 2010/038552 A1 | 4/2010 |

* cited by examiner (A)

(B)

TACTILE SENSE PRESENTATION DEVICE AND TACTILE SENSE PRESENTATION METHOD

CROSS-REFERENCE TO RELATED APPLICATION

This application is based on PCT filing PCT/JP2021/024964, filed Jul. 1, 2021, the entire contents of which are incorporated herein by reference.

TECHNICAL FIELD

The present application relates to a tactile sense presentation device and a tactile sense presentation method.

BACKGROUND ART

In a touch operation on a touch panel, feedback to a tactile stimulus is small compared to a case where a mechanical button is pressed. In view of this, a tactile sense presentation device is known that presents a tactile stimulus to a user by vibrating a touch position on a touch panel. For example, Patent Document 1 discloses a tactile sense presentation device that presents individual vibration waveforms to a plurality of touch positions on a touch panel by using a plurality of actuators. In this tactile sense presentation device, an inverse matrix of a transfer characteristic from each actuator to each touch position is calculated, and the actuator is driven by a drive voltage signal obtained by multiplying a target vibration waveform by the inverse matrix. Thus, the target vibration waveform is presented to each touch position.

PRIOR ART DOCUMENT

Patent Document

Patent Document 1: International publication No. WO2010/038552

SUMMARY OF INVENTION

Problems to be Solved by Invention

However, there is an upper limit to a drive voltage that can be output to the actuator in the tactile sense presentation device of the related art. Therefore, in a case where the calculated drive voltage signal exceeds the upper limit of the drive voltage that can be output to the actuator, there is a concern that vibration for presenting an appropriate tactile stimulus to a user may not be generated.

The present disclosure has been made to solve the above-described problem, and an object of the present disclosure is to provide a tactile sense presentation device and a tactile sense presentation method capable of generating a vibration for presenting an appropriate tactile stimulus to a user within a preset voltage range.

Means for Solving Problems

A tactile sense presentation device of the present disclosure includes a touch panel, a housing that supports the touch panel, an actuator that is installed on the touch panel and vibrates the touch panel, a touch sensor that detects a touch position on the touch panel, a signal calculation unit that calculates a first drive voltage signal using a target vibration preset to correspond to the touch position and a vibration transfer characteristic up to the touch position through the actuator, sets the first drive voltage signal as a second drive voltage signal when the first drive voltage signal is within a preset voltage range, and reduces components of a first frequency band of the calculated first drive voltage signal less than a preset frequency to calculate the second drive voltage signal within the preset voltage range when the first drive voltage signal exceeds the preset voltage range, and an output unit that outputs the second drive voltage signal to the actuator.

Further, a tactile sense presentation method in the present disclosure includes a step of detecting a touch position on a touch panel, a step of calculating a first drive voltage signal by using a target vibration preset to correspond to the detected touch position and a vibration transfer characteristic up to the touch position through an actuator, a step of setting the first drive voltage signal as a second drive voltage signal when the first drive voltage signal is within a preset voltage range, and a step of calculating the second drive voltage signal within the preset voltage range by reducing components of a first frequency band of the first drive voltage signal less than a preset frequency when the first drive voltage signal exceeds the preset voltage range, and a step of outputting the second drive voltage signal to the actuator.

Advantageous Effect of Invention

According to the present disclosure, it is possible to generate a vibration for presenting an appropriate tactile stimulus to a user within a preset voltage range.

MODE FOR CARRYING OUT INVENTION

Embodiment 1

<Configuration>

Figure 1:
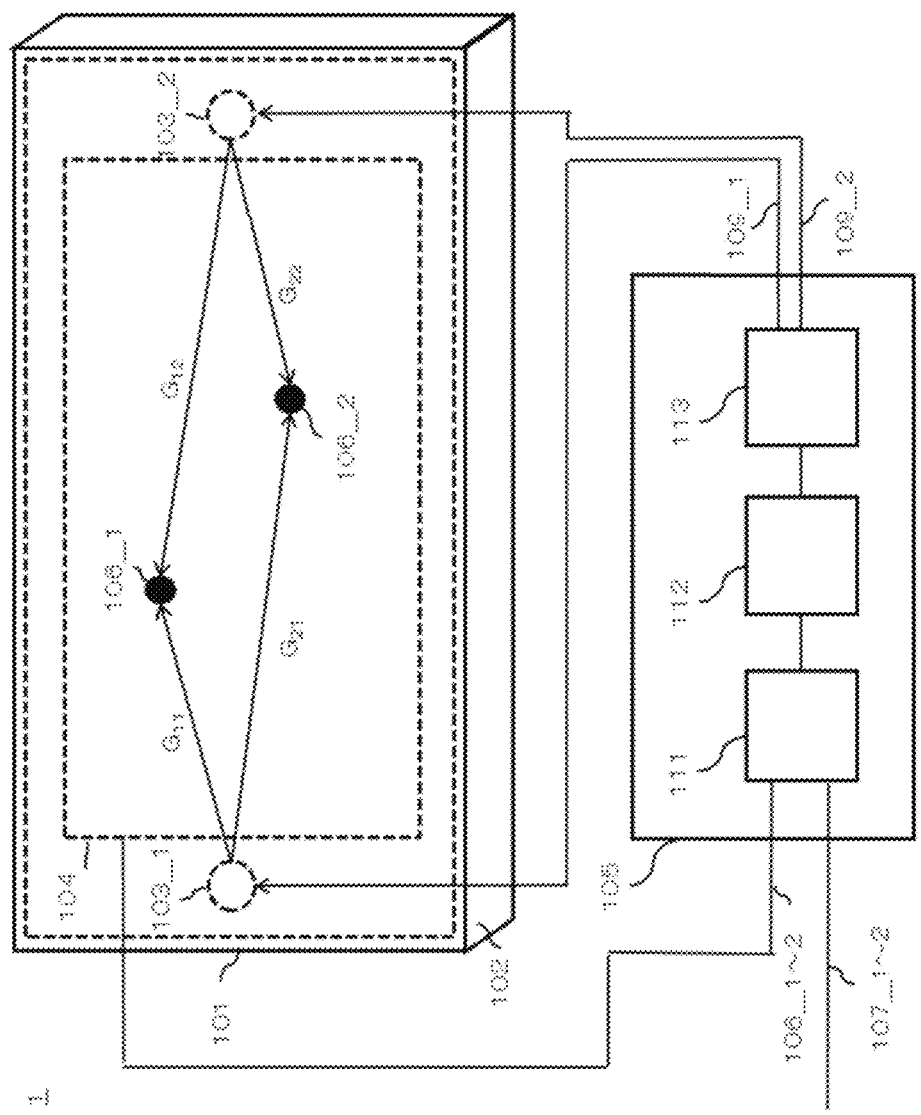
FIG. 1 is a schematic diagram of a tactile sense presentation device according to Embodiment 1.

A tactile sense presentation device 1 according to Embodiment 1 will be described with reference to FIG. 1. FIG. 1 is a schematic diagram of the tactile sense presentation device 1 in Embodiment 1. The tactile sense presentation device 1 includes a touch panel 101, a housing 102, two actuators 1031, 103_2, a touch sensor 104, and a signal processing unit 105. Hereinafter, each of the configurations of the tactile sense presentation device 1 will be described.

The touch panel 101 is a panel on which a user performs an operation by touching with a finger, and is, for example, a plate-like member made of glass or resin. The size, the shape, the thickness, and the material of the touch panel 101 are not particularly limited as long as the touch panel 101 has strength to allow for maintaining the shape and can transmit vibration for presenting a tactile stimulus to the user.

The housing 102 is a housing for supporting the touch panel 101 and is partly connected to the touch panel 101. There is no particular limitation on a connection portion and a connection method as long as the housing 102 is connected so as to support the touch panel 101. The housing 102 and the touch panel 101 may be connected via a viscoelastic body such as silicone rubber (not shown).

Each of the actuators 103_1 and 103_2 is an actuator attached so as to vibrate the touch panel 101, and includes, for example, a voice coil or a piezoelectric vibrator. The actuators 103_1 and 103_2 are each disposed at a different position on the touch panel 101. Note that the actuators 103_1 and 103_2 only need to be capable of vibrating the touch panel 101, and the type and attachment method thereof are not particularly limited. One end of each of the actuators 103_1 and 103_2 may be connected to the housing 102. Further, the actuators 103_1 and 1032 may each include an amplifier circuit necessary for driving.

The touch sensor 104 is a sensor that detects a touch position 106 touched by a user's finger. For example, the touch sensor 104 is configured by a sheet-like sensor of a capacitance type, and is integrally attached to the touch panel 101. The touch sensor 104 performs position detection using a large number of electrode rows arranged in two layers in a matrix, thereby simultaneously detecting a plurality of touch positions 106 when different places are simultaneously touched by a plurality of fingers. The number of touch positions 106 that can be simultaneously detected is designed in accordance with the number of simultaneous touches assumed in an intended use of the tactile sense presentation device 1, and FIG. 1 illustrates touch positions 106_1 and 106_2 in a case where two simultaneous touches are performed. Note that the touch sensor 104 may be a sensor other than the capacitance type as long as it can simultaneously detect the number of touch positions 106 to be assumed, and the type and form thereof are not particularly limited.

Further, the touch panel 101 may be provided with a display panel (not shown) such as a thin film transistor (TFT) panel or an organic electro luminescence (EL) panel so as to display image data. In the case where the display panel is provided, it is possible to display an image of a button or a knob and present a method of a touch operation to the user in an intuitively understandable manner. In this case, the actuators 103_1 and 103_2 are arranged, for example, in a peripheral portion of the touch panel 101 so as not to interfere with the display region.

The signal processing unit 105 is an electric circuit for performing arithmetic processing, and includes an input unit 111, a signal calculation unit 112, and an output unit 113 therein.

The input unit 111 is an electric circuit including an input interface, and receives, as inputs, information indicating the two touch positions 106_1 and 106_2 detected by the touch sensor 104 and information indicating target vibrations 107_1 and 107_2 to be presented to the touch positions 106_1 and 1062, respectively.

The signal calculation unit 112 is an arithmetic circuit that calculates first drive voltage signals 108_1 and 108_2 using the target vibrations 107_1 and 107_2 set in advance to correspond to the touch positions 106_1 and 106_2, and the vibration transfer characteristic up to the touch positions 106_1 and 106_2 via the actuators 103_1 and 103_2. Then, using the calculated first drive voltage signals 108_1 and 108_2, the signal calculation unit 112 calculates second drive voltage signals 109_1 and 109_2 to be output to the actuators 103_1 and 103_2, respectively.

The output unit 113 is an electric circuit including an output interface connected to each of the actuators 103_1 and 103_2, and outputs the second drive voltage signals 109_1 and 109_2 calculated by the signal calculation unit 112 to each of the actuators 103_1 and 103_2.

The range of the voltage that can be applied to the actuators 103_1 and 103_2 is limited in advance by the circuit configuration of the output unit 113 and the configuration of an amplifier circuit in a case where the actuators 103_1 and 103_2 include amplifier circuits therein. Even when a voltage exceeding the limited range is to be output, a phenomenon such as saturation occurs and an intended voltage is not output. In addition, a range in which the actuators 103_1 and 103_2 can linearly move is also determined in advance, and when a voltage exceeding the range for the linearly movable range is applied, not only intended vibration is not output but also a malfunction or a failure may be caused. Therefore, the range of the voltage value that can be applied to the actuators 103_1 and 103_2 is limited. Therefore, the signal calculation unit 112 uses the first drive voltage signals 108_1 and 108_2 to calculate the second drive voltage signals 109_1 and 109_2 that fall within the voltage range in which the actuators 103_1 and 103_2 normally operate.

The signal processing unit 105 (the input unit 111, the signal calculation unit 112, and the output unit 113) is configured by a combination of, for example, a general-purpose digital signal processor (DSP), an application specific integrated circuit (ASIC), a field programmable gate array (FPGA), a memory, a hard disk drive (HDD), an input/output interface circuit, a bus circuit coupling them, an AD converter, a DA converter, an analog filter circuit, and an amplifier circuit for inputting and outputting analog signals, and software describing the operation of the DSP. Such functions of the signal input/output and the arithmetic processing can be implemented by a combination of various hardware and software, and a specific configuration is not particularly limited as long as the functions are implemented.

Note that the tactile sense presentation device 1 in FIG. 1 has two touch positions 106 and two actuators 103, and the above description has been made in accordance with this configuration, but the present disclosure is not limited to this configuration. The number of touch positions 106 may be one or may be more than two. Similarly, the number of actuators 103 may be one or more than two. In this case, the touch sensor 104 is configured to have a function of simultaneously detecting M or more touch positions and detect the touch positions 106_1 to 106_M, where M and N are each an integer of 1 or more.

The input unit 111 is configured to receive information on the M touch positions 106_1 to 106_M detected by the touch sensor 104 and the target vibrations 107_1 to 107_M to be presented to the touch positions 106_1 to 106_M, respectively. The signal calculation unit 112 is configured to calculate N first drive voltage signals 108_1 to 108_N and N second drive voltage signals 109_1 to 109_N from the touch positions 106_1 to 106_M and the target vibrations 107_1 to 107_M to be presented to the touch positions 106_1 to 106_M, respectively. The output unit 113 is connected to each of the actuators 103_1 to 103_N and is configured to output the second drive voltage signals 109_1 to 109_N calculated by the signal calculation unit 112 to the actuators 103_1 to 103_N, respectively. In this case as well, the range of voltage values that the second drive voltage signals 109_1 to 109_N can take is limited, and the second drive voltage signals 109_1 to 109_N are calculated so as to fall within the voltage range in which the actuators 103_1 to 103_N normally operate.

In the following description of the operation, M and N are integers equal to or greater than 1, and the description is generalized to M touch positions 106_1 to 106_M and N actuators 103_1 to 103_N. In addition, m: m=1 to M and n: n=1 to N are set.

<Operation>

Next, an operation of the tactile sense presentation device 1 according to Embodiment 1, that is, a tactile sense presentation method will be described.

When the user touches the touch panel 101 with a finger, the touch sensor 104 attached to the touch panel 101 detects a touch position 106. Here, it is assumed that M touch positions 106_1 to 106_M on the touch panel 101 are detected.

The signal processing unit 105 receives, as information in the input unit 111, the touch positions 106_1 to 106_M detected by the touch sensor 104 and the target vibrations 107_1 to 107_M to be presented to the touch positions 106_1 to 106_M, respectively.

Figure 2:
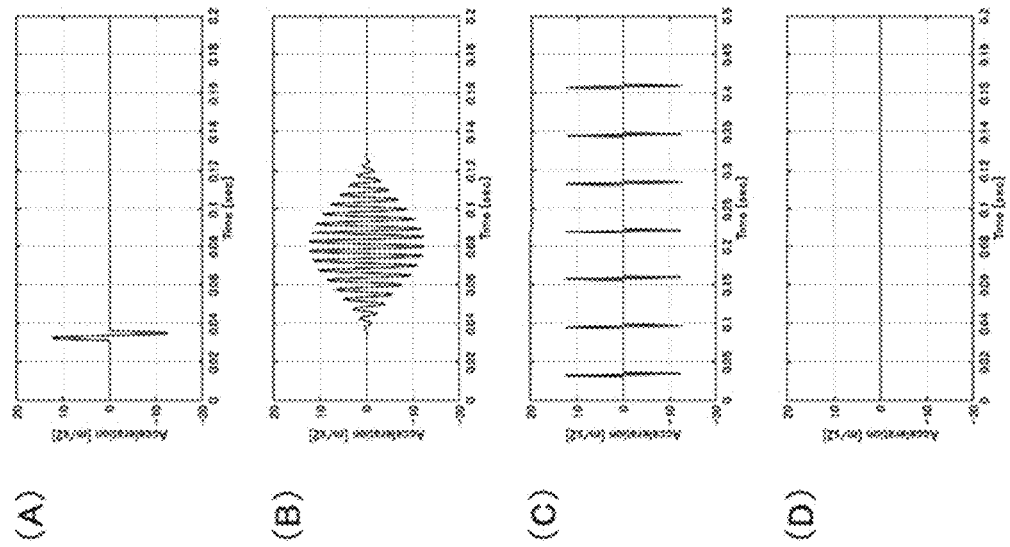
FIG. 2 is a graph showing an example of a time waveform of a target vibration 107 according to Embodiment 1.

Which waveform of vibration is to be presented to which of the touch positions 106_1 to 106_M is determined in advance in accordance with the specifications of the user interface intended to be provided. FIG. 2 is a graph showing an example of a time waveform of the target vibration 107 according to Embodiment 1.

For example, in a case where the touch position 106 is a display position of a button, a single sharp stimulus with a click feeling as if the button is pressed is suitable. Therefore, as shown in FIG. 2(A), a vibration having a waveform with a short duration in which the vibration steeply changes is set as the target vibration 107. FIG. 2(A) shows a waveform of one cycle of a sinusoidal wave having a frequency of 200 Hz. This waveform is calculated by multiplying a sinusoidal wave having a frequency of 200 Hz by a rectangular wave having a length of one cycle as an envelope waveform.

In addition, even in the case of the same single stimulus, in a case where a slightly gentle tactile stimulus is presented, as shown in FIG. 2(B), a vibration of a waveform that gently changes and has a slightly long duration is set as the target vibration 107. FIG. 2(B) shows a waveform obtained by multiplying a sinusoidal wave having a frequency of 200 Hz by a smooth envelope waveform over several cycles of the sinusoidal wave.

Further, when the touch position 106 is a display position of a slide bar, a stimulus in which a click is continuously repeated in response to the movement of the slide bar is suitable. Therefore, as shown in FIG. 2(C) vibration having a waveform in which peaks are repeated is set as the target vibration 107. The waveform of FIG. 2(C) is a waveform in which the waveform of one cycle of the sinusoidal wave having a frequency of 200 Hz is repeated at constant intervals.

Further, also in a case where some warning is issued in response to a touch operation, a stimulus in which a sharp click is repeated in order to attract the attention of the user is suitable, and a vibration having the waveform as shown in FIG. 2(C) is set as the target vibration 107.

Further, in a case when a position in which there is no operation object is touched, vibration is not presented. In this case, as shown in FIG. 2(D), vibration having a waveform whose magnitude is 0 at any time is set as the target vibration 107.

Further, when the arrangement or the type of the operation object displayed on the screen is changed, the correspondence between the touch position 106 and the target vibration 107 is also changed accordingly.

That is, the correspondence between the touch position 106 and the target vibration 107 varies depending on the intention in presenting the tactile stimulus to the user and is to be set such that the intended function can be presented to the user in designing an application software using the tactile sense presentation device 1 of the present embodiment. Then, on the basis of the correspondence, information of the target vibrations 107_1 to 107_M determined outside the tactile sense presentation device 1 is input to the tactile sense presentation device 1.

Here, it is assumed that the target vibration 107_1 is the vibration of the time waveform corresponding to one cycle of the sinusoidal wave having a frequency of 200 Hz shown in FIG. 2(A), and the target vibrations 107_2 to 107_M are the vibrations of the time waveform having a magnitude of 0 at any time shown in FIG. 2(D).

Note that the input target vibrations 107_1 to 107_M may be configured such that waveform data of the target vibrations 107_1 to 107_M itself is input, or may be configured such that identifiers of the target vibrations 107_1 to 107_M are input. In the case of the configuration in which the identifiers of the target vibrations 107_1 to 107_M are input, various time waveforms to be used as the target vibrations 107_1 to 107_M are stored in advance in a storage device (not shown) such as a non-volatile memory provided in the signal calculation unit 112, and the time waveforms corresponding to the input identifiers of the target vibrations 107_1 to 107_M are selected.

Further, as will be described later, it is known that the sensitivity in the characteristics of a human finger with respect to vibration acceleration is high at frequencies equal to or lower than 300 Hz, and particularly, the sensitivity in the characteristics near 200 Hz is high. Therefore, any of the waveforms shown in FIG. 2 (A) to FIG. 2(C) is a waveform obtained by modulating the sinusoidal wave having the frequency of 200 Hz with some envelope waveform, and includes many frequency components near the frequency of 200 Hz. Here, the modulation refers to multiplying a sinusoidal wave of a predetermined frequency by some envelope waveform. The waveform of FIG. 2(D) is also a waveform obtained by multiplying the sinusoidal wave having the frequency of 200 Hz by 0 and can be regarded as a waveform obtained by modulating the sinusoidal wave having the frequency of 200 Hz.

When information indicating the touch positions 106_1 to 106_M and the target vibrations 107_1 to 107_M is input to the input unit 111, the signal calculation unit 112 calculates the first drive voltage signals 108_1 to 108_N and the second drive voltage signals 109_1 to 109_N according to procedures of STEP1 to STEP4 to be described later.

Here, for the preparation of the description of STEP1 to STEP4, the handling of the data and calculation in the signal calculation unit 112 will be described.

In the signal calculation unit 112, all time-series signals used for calculation, such as $x_m(t)$ and $g_{mn}(t)$ to be described later, are handled as sampled digital data, and the sampling frequency is set to 2048 Hz. That is, t is a time index that takes a discrete value in increments of 1/2048 second. As a sampling theorem, it is known that sampled data can hold information up to a frequency of the half of the sampling frequency. Therefore, if the sampling frequency is 2048 Hz, it is possible to maintain a frequency band up to about 1 kHz, which is sufficient for handling the time waveform of vibration centered at 200 Hz.

Further, although each numerical value of the time series data is also digitized, it is handled in a data type having a sufficient accuracy so that a large calculation error does not occur. For example, by using the double-precision floating-point type data, it is possible to suppress the calculation error to be sufficiently small. Here, it is assumed that the data is held as double-precision floating-point type data.

Further, in the present embodiment, description will be given by converting time series data into data in the frequency domain as appropriate, but data in the time domain and data in the frequency domain can be mutually converted by discrete Fourier transform and inverse discrete Fourier transform, and there is no essential difference even if data is stored or calculated in either domain. That is, as long as the data in the time domain and the data in the frequency domain are appropriately associated with each other by the discrete Fourier transform and the inverse discrete Fourier transform, an equivalent arithmetic operation can be performed in either domain, and the configuration of the present disclosure is not limited to the method of storing and calculating data described in the present embodiment.

Further, the time waveform of the target vibration 107_m (m=1 to M) is expressed as $x_m(t)$, where $x_m(t)$ is a value of the vibration acceleration at time t.

In addition, the time waveform of the vibration transfer characteristic transferred to the touch position 106_m (m=1 to M) via the actuator 103_n (n=1 to N) is represented by $g_{mn}(t)$. The value $g_{mn}(t)$ is a value at time t of the vibration acceleration generated at the touch position 106_m when the voltage of the unit impulse is applied to the actuator 103_n at time 0.

The vibration transfer characteristic can be calculated by applying voltage of a reference signal to each actuator and measuring the vibration generated at a touch position as a response to the voltage. As the reference signal, a broadband signal such as white noise, an impulse, or a time stretched pulse (TSP) is typically used. As for the measurement locations, for example, candidate positions for the touch positions 106_1 to 106_M are set in a grid pattern in a region on the touch panel 101 where a touch operation is expected, and data of the transfer characteristic is measured in advance for all combinations between each of the actuators 103_1 to 103_N and each grid point. The measured vibration transfer characteristic data are stored in advance in a storage device (not shown) such as a non-volatile memory included in the signal calculation unit 112, and the vibration transfer characteristic data of the grid points corresponding to the touch positions 106_1 to 106_M are used to calculate the first drive voltage signals 108_1 to 108_N. When the actual touch positions 106_1 to 106_M are different from the positions of the grid points of the measured transfer characteristics, the vibration transfer characteristics to the grid points closest to the touch positions 106_1 to 106_M may be used as the transfer characteristics to the touch positions 106_1 to 106_M. Further, the transfer characteristics to the touch positions 106_1 to 106_M may be obtained by interpolation from the transfer characteristics to several grid points around the touch positions 106_1 to 106_M.

The interval between the grid points is desirably as narrow as possible because differences from the actual touch positions 106_1 to 106_M are less likely to occur. However, in consideration of the size of the fingertip, it is sufficient that the interval is equal to or smaller than 1 cm. Further, the time width of the stored vibration transfer characteristic data should be a time width in which the time waveform is sufficiently converged without being cut in the middle. Since the time at which the time waveform of the vibration transfer characteristic converges is determined by the characteristic of the vibration system such as the touch panel 101 and the housing 102 and silicone rubber (not shown) that support the touch panel 101, the time width of the vibration transfer characteristic data is set in accordance with the characteristic of the vibration system included in the tactile sense presentation device 1. Here, the time width is set to 1 second. At this time, since the sampling frequency is 2048 Hz, the number of samples of one of the time waveforms in the vibration transfer characteristic data to be stored (the number of numerical values of the time series data) is 2048.

Step 1

In STEP 1, the signal calculation unit 112 calculates the first drive voltage signals 108_1 to 108_N from the time waveforms of the target vibrations 107_1 to 107_M and the vibration transfer characteristics up to the touch positions 106_1 and 106_2 via the actuators 103_1 to 103_N.

The first drive voltage signals 108_1 to 108_N are calculated for the actuators 103_1 to 103_N, respectively, and the time waveforms thereof are represented as $z_n(t)$ (n=1 to N), where $z_n(t)$ is a value of the drive voltage at the time t. Also in this case, t is a time index that takes a discrete value at an interval of 1/2048 second, and the time waveform $z_n(t)$ of the first drive voltage signal is a digital data sampled at the sampling frequency 2048 Hz.

The time waveform $z_n(t)$ of the first drive voltage signal is calculated as follows. First, the time waveform $g_{mn}(t)$ (m=1 to M, n=1 to N) of the vibration transfer characteristic is converted into data in the frequency domain by discrete Fourier transform. The converted vibration transfer characteristic is represented by $G_{mn}(f)$, where $G_{mn}(f)$ (m=1 to M, n=1 to N) is a complex number representing the amplitude (magnitude) and phase of a component at the frequency f of the vibration transfer characteristic. Here, f is an index representing a frequency. And, f is associated with the time index t by the discrete Fourier transform, taking discrete values: the number is "number of samples/2+1" from 0 Hz in increments of "sampling frequency/number of samples". Here, the sampling frequency is 2048 Hz and the time waveform has 2048 samples, and thus f takes 1025 values from 0 Hz to 1024 Hz in 1 Hz increments.

Next, a matrix $[H_{nm}(f)]$ having an inverse characteristic of $[G_{mn}(f)]$ is calculated for each frequency f. Note that $[A_{mn}]$ represents a matrix having $A_{mn}$ as an element in the m-th row and the n-th column. Therefore, $[G_{mn}(f)]$ is a matrix of M rows and N columns having $G_{mn}(f)$ (m=1 to M, n=1 to N) as an element of the m-th row and the n-th column, and $[H_{nm}(f)]$ is a matrix of N rows and M columns having $H_{nm}(f)$ (n=1 to N, m=1 to M) as an element of the n-th row and the m-th column.

Here, the matrix having the inverse characteristic of $[G_{mn}(f)]$ is a matrix having a characteristic of canceling $[G_{mn}(f)]$, and is a matrix in which $[G_{mn}(f)] \times [H_{nm}(f)]$ is close to a unit matrix. For example, when the number M of the touch positions 106_1 to 106_M and the number N of the actuators 103_1 to 103_N are the same, that is, when M=N, $[H_{nm}(f)]$ can be obtained as an inverse matrix of $[G_{mn}(f)]$. When the number M of the touch positions 106_1 to 106_M does not coincide with the number N of the actuators 103_1 to 103_N, the inverse matrix $[H_{nm}(f)]$ can be obtained as a generalized inverse matrix. By setting $[H_{nm}(f)]$ as the generalized inverse matrix, if N>M, it is possible to calculate a matrix in which $[G_{mn}(f)] \times [H_{nm}(f)]$ is a unit matrix, and if M>N, it is not possible to obtain an inverse matrix exactly, but it is possible to calculate a matrix having approximately an inverse characteristic.

In addition, even when the number M of the touch positions 106_1 to 106_M and the number N of the actuators 103_1 to 103_N are the same, $[G_{mn}(f)]$ may not have an inverse matrix due to rank deficiency. In this case, the inverse matrix $[H_{nm}(f)]$ may be obtained as the generalized inverse matrix, or may be obtained as an inverse matrix of $[cI+G_{mn}(f)]$. Here, I is a unit matrix, c is a constant, and a method of obtaining an inverse matrix by adding cI is known as a method of preventing divergence of the inverse matrix due to rank deficiency. In this case as well, an exact solution cannot be obtained, but a matrix having approximately an inverse characteristic can be calculated.

As described above, $[H_{nm}(f)]$ can be obtained by using many generally known methods including those for an approximate solution, and the method of obtaining $[H_{nm}(f)]$ is not particularly limited as long as $[H_{nm}(f)]$ is a matrix having a characteristic of canceling $[G_{mn}(f)]$. However, when the number N of the actuators 103_1 to 103_N is smaller than the number M of the touch positions, the accuracy as the inverse characteristic of $[H_{nm}(f)]$ may be significantly deteriorated. In order for the calculated $[H_{nm}(f)]$ to have a favorable inverse characteristic of $[G_{mn}(f)]$, it is better that the number N of the actuators 103_1 to 103_N is equal to or larger than the number M of the touch positions 106_1 to 106_M.

Next, the calculated inverse characteristic $H_{nm}(f)$ (n=1 to N, m=1 to M) is converted into data in the time domain by inverse discrete Fourier transform. The time waveform of the inverse characteristic after the conversion is represented by $h_{nm}(t)$, where t is an index indicating time, is associated with the index f of the frequency by the inverse discrete Fourier transform and takes 2048 values in an interval of ½₀₄₈ second.

Further, a calculation, $[z_n(t)]=[h_{nm}(t)]*[x_m(t)]$, is performed using the calculated $h_{nm}(t)$ (n=1 to N, m=1 to M) and the time waveform $x_m(t)$ (m=1 to M) of the target vibration, and the first drive voltage signal $z_n(t)$ (n=1 to N) is to be calculated.

Here, [Bn] represents a vector having Bn as the n-th element. Therefore, $[x_m(t)]$ is an M-element vector having $x_m(t)$ (m=1 to M) as the m-th element, and $[z_n(t)]$ is an N-element vector having $z_n(t)$ (n=1 to N) as the n-th element. In addition, * is a convolution operation and represents an operation according to Expression (1).

$$f(t)*g(t) = \sum_{k=1}^{K} f(\tau_k) \times (g - \tau_k) \quad (1)$$

In Expression (1), K represents the number of samples of f(t), and $\tau_k$ represents the time of the k-th sample of f(t). When * is applied to a matrix operation, the operation is performed according to Expression (2).

$$[h_m(t)]*[x_m(t)] = \left[\sum_{m=1}^{M} h_m(t)*x_m(t)\right] \quad (2)$$

As described above, the signal calculation unit 112 calculates the time waveform $z_n(t)$ (n=1 to N) of the first drive voltage signal.

When the time waveform $z_n(t)$ (n=1 to N) of the first drive voltage signal is applied to each of the actuators 103_1 to 103_N, a vibration acceleration $y_m(t)$ (m=1 to M) generated at each of the touch positions 106_1 to 106_M is calculated as $[y_m(t)]=[g_{mn}(t)]*[z_n(t)]=[g_{mn}(t)]*[h_{nm}(t)]*[x_m(t)]$ because the vibration in which the vibration transfer characteristic $g_{mn}(t)$ from the actuator 103_n to the touch position 106_m is convoluted is superimposed on the time waveform $z_n(t)$ (n=1 to N) of the applied first drive voltage signal for all n: n=1 to N.

$[H_{nm}(f)]$ is a matrix having inverse characteristic of the vibration transfer characteristic matrix $[G_{mn}(f)]$, and multiplication in the frequency domain corresponds to a convolution operation in the time domain. Therefore, by convolving $[g_{mn}(t)]$ and $[h_{nm}(t)]$, both of the characteristics cancel each other, and the vibration acceleration $y_m(t)$ generated at the touch position 106_m (m=1 to M) substantially matches the target vibration acceleration $x_m(t)$. In other words, the calculated time waveform $z_n(t)$ (n=1 to N) of the first drive voltage signal is a drive voltage signal calculated so as to present the vibration acceleration of the time waveform $x_m(t)$ of the target vibration to the touch position 106_m (m=1 to M) as accurately as possible.

<Step2>

In STEP2, the signal calculation unit 112 separates the time waveform $z_n(t)$ (n=1 to N) of the first drive voltage signal into components of a first frequency band 114 of frequencies lower than a predetermined frequency $F_b$, and components of a second frequency band 115 of frequencies equal to or higher than the predetermined frequency $F_b$.

The frequency $F_b$ is set to frequencies lower than the frequency of the main components of the target vibrations 107_1 to 107_M. Here, since the target vibration 107_1 has the waveform obtained by multiplying the sinusoidal wave of 200 Hz by the envelope waveform and has large frequency components around 200 Hz, the frequency $F_b$ is set to 100 Hz lower than 200 Hz.

Figure 3:
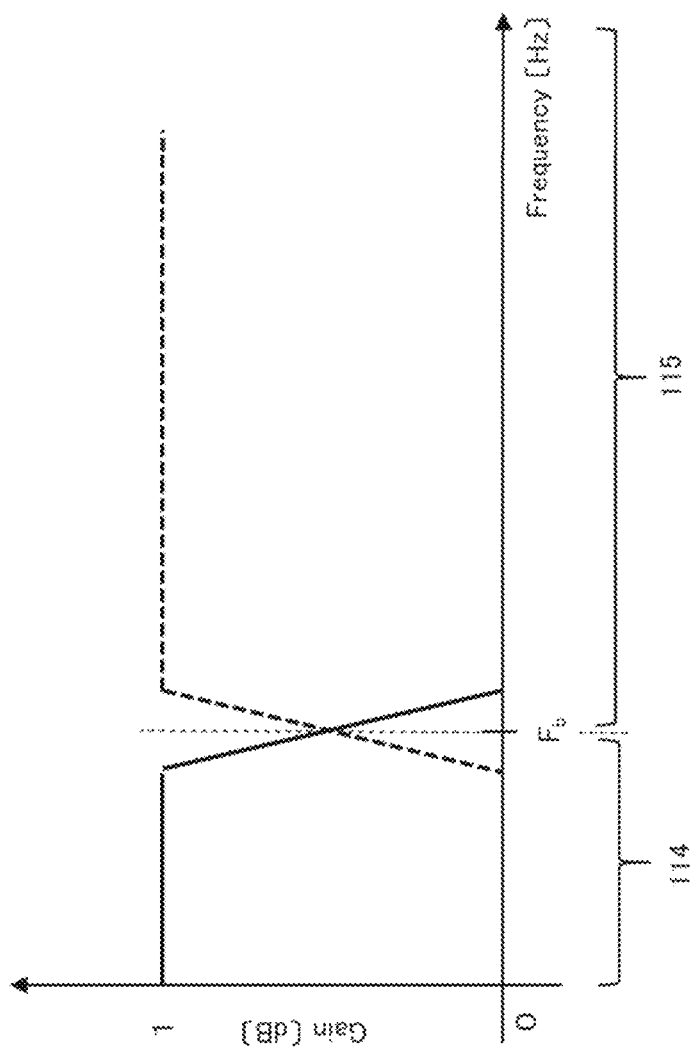
FIG. 3 is a graph showing frequency characteristics of a first separation filter $w_1(t)$ and a second separation filter $w_2(t)$ according to Embodiment 1.

Here, a time waveform of the components of the first frequency band 114 is referred to as $z_{1n}(t)$, and a time waveform of the components of the second frequency band 115 is referred to as $z_{2n}(t)$, which are separated from the time waveform $z_n(t)$ (n=1 to N) of the first drive voltage signal. Further, a time waveform of a first separation filter for separating the components of the first frequency band 114 is represented by $w_1(t)$, and a time waveform of a second separation filter for separating the components of the second frequency band 115 is represented by $w_2(t)$. FIG. 3 is a graph showing the frequency characteristics of the time waveform $w_1(t)$ of the first separation filter and the time waveform $w_2(t)$ of the second separation filter according to Embodiment 1. The solid line in FIG. 3 represents the frequency characteristic of the time waveform $w_1(t)$ of the first separation filter, and the broken line in FIG. 3 represents the frequency characteristic of the second separation filter $w_2(t)$.

The time waveform $w_1(t)$ of the first separation filter has a frequency characteristic that passes components of the first frequency band 114 below frequency $F_b$ and blocks components of the second frequency band 115 above frequency $F_b$. The time waveform $w_2(t)$ of the second separation filter has a frequency characteristic that blocks components of the first frequency band 114 below frequency $F_b$ and passes components of the second frequency band 115 above frequency $F_b$.

It is not necessary for the first separation filter and the second separation filter to completely pass or block components of a high frequency band or a low frequency band with the frequency $F_b$ as a boundary, and the first separation filter and the second separation filter have characteristics of overlapping each other in a certain degree of bandwidth. However, the gain of the first separation filter is larger in the first frequency band 114, the gain of the second separation filter is larger in the second frequency band 115, and the sum of the gains for the passing in both filters is 1 at all frequencies.

The time waveforms $z_{1n}(t)$ and $z_{2n}(t)$ are calculated as follows by using the time waveform $w_1(t)$ of the first separation filter and the time waveform $w_2(t)$ of the second separation filter. A time waveform obtained by convolving the time waveform $z_n(t)$ of the first drive voltage signal with the time waveform $w_1(t)$ of the first separation filter is denoted by $z_{1n}(t)$. Further, a time waveform obtained by convolving the time waveform $z_n(t)$ of the first drive voltage signal with the time waveform $w_2(t)$ of the second separation filter is denoted by $z_{2n}(t)$.

At this time, $z_{1n}(t)$ is the time waveform mainly composed of components of $z_n(t)$ in the first frequency band 114, $z_{2n}(t)$ is the time waveform mainly composed of components of $z_n(t)$ in the second frequency band 115, and the sum of the gains for the passing in $w_1(t)$ and $w_2(t)$ is 1 at all frequencies, so that the waveform obtained by adding $z_{1n}(t)$ and $z_{2n}(t)$ is equal to $z_n(t)$.

<Step3>

In STEP3, the signal calculation unit 112 determines synthesis coefficients for synthesizing $z_{1n}(t)$ (n=1 to N) and $z_{2n}(t)$ (n=1 to N) to calculate the second drive voltage signals 109_1 to 109_N.

A time waveform of the second drive voltage signal 109_n (n=1 to N) is denoted by $y_n(t)$, and $y_n(t)$ is a linear sum of $z_{1n}(t)$ and $z_{2n}(t)$, that is, $y_n(t)=\alpha z_{1n}(t)+\beta z_{2n}(t)$, where $\alpha$ and $\beta$ are synthesis coefficients.

In addition, an upper limit of the voltage (absolute value) that can be taken by the second drive voltage signals 109_1 to 109_N is set to $V_{max}$. Here, $V_{max}$ is set to a rated voltage value of the device or an upper limit value of a voltage at which the actuators 103_1 to 103_N can be linearly driven.

<Procedure for Determining Synthesis Coefficients $\alpha$ and $\beta$>

When $\alpha=1$ and $\beta=1$, the time waveform $y_n(t)$ of the second drive voltage signal is equal to the time waveform $z_n(t)$ of the first drive voltage signal. From this state, $\alpha$ is preferentially reduced in a range where both $\alpha$ and $\beta$ are 0 or more, and the synthesis coefficients $\alpha$ and $\beta$ are determined such that $\alpha z_{1n}(t)+\beta z_{2n}(t)$ falls within a range of $-V_{max}$ to $+V_{max}$ for all n: n=1 to N. At this time, since $\alpha$ is preferentially reduced, $\alpha \leq \beta$ is satisfied.

Figure 4:
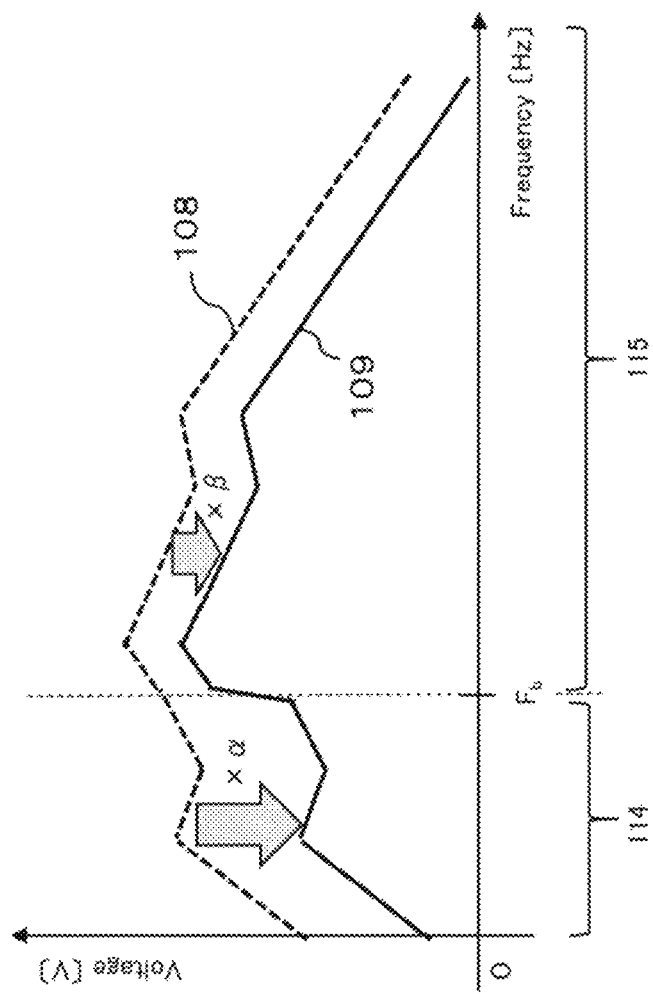
FIG. 4 is a graph showing a relationship between frequency characteristics of a first drive voltage signal 108 and a second drive voltage signal 109 in Embodiment 1.

FIG. 4 is a graph showing the relationship between the frequency characteristics of a first drive voltage signal 108 and a second drive voltage signal 109 according to Embodiment 1. It indicates the relationship in the frequency characteristics between the time waveform $z_n(t)$ (n=1 to N) of the first drive voltage signal and the time waveform $y_n(t)$ of the second drive voltage signal corresponding thereto. The broken line graph shows the frequency characteristic of the time waveform $z_n(t)$ of the first drive voltage signal, and the solid line graph shows the frequency characteristic of the time waveform $y_n(t)$ of the second drive voltage signal. The time waveform $y_n(t)$ of the second drive voltage signal is a signal obtained by multiplying the components of the time waveform $z_n(t)$ of the first drive voltage signal in the first frequency band 114 by $\alpha$ and multiplying the components of the time waveform $z_n(t)$ of the first drive voltage signal in the second frequency band 115 by $\beta$.

Since $\alpha \leq \beta$, the time waveform $y_n(t)$ of the second drive voltage signal is a signal in which the components of the first frequency band 114 are greatly reduced compared to the components of the second frequency band 115 in the time waveform $z_n(t)$ of the first drive voltage signal.

Hereinafter, an example of a specific procedure for determining the synthesis coefficients $\alpha$ and $\beta$ will be described. First, the signal calculation unit 112 sets $\alpha=1$ and $\beta=1$, and calculates a time waveform $yy_n(t)=\alpha z_{1n}(t)+\beta z_{2n}(t)$ as a provisional second drive voltage signal. When $yy_n(t)$ falls within a range of $-V_{max}$ to $+V_{max}$ for all n: n=1 to N, $\alpha=1$ and $\beta=1$ are set. In this case, since $yy_n(t)$ is equal to $z_n(t)$, the first drive voltage signals 108_1 to 108_N and the second drive voltage signals 109_1 to 109_N are equal to each other.

In a case where the time waveform $yy_n(t)$ of the provisional second drive voltage signal does not fall within the range of $-V_{max}$ to $+V_{max}$, $\beta$ is maintained at 1, $\alpha$ is decreased from 1, and a value of $\alpha$ is adopted when $yy_n(t)$ falls within the range of $-V_{max}$ to $+V_{max}$ for all n: n=1 to N.

If $yy_n(t)$ does not fall within the range of $-V_{max}$ to $+V_{max}$ even when $\alpha=0$, $\alpha$ is kept at 0, $\beta$ is decreased from 1, and a value of $\beta$ is adopted when $yy_n(t)$ falls within the range of $-V_{max}$ to $+V_{max}$ for all n: n=1 to N. The synthesis coefficients $\alpha$ and $\beta$ are determined by the above procedure.

<Step4>

In STEP4, the signal calculation unit 112 calculates the second drive voltage signals 109_1 to 109_N. To be specific, the time waveform $y_n(t)$ for the second drive voltage signals 109_1 to 109_N is calculated according to $y_n(t)=\alpha z_{1n}(t)+\beta z_{2n}(t)$ by using $\alpha$ and $\beta$ determined in STEP3.

Here, when $\alpha=1$ and $\beta=1$, the time waveform $y_n(t)$ of the second drive voltage signal is equal to the time waveform $z_n(t)$ of the first drive voltage signal. Further, in the case of $\alpha<\beta$, the time waveform $y_n(t)$ of the second drive voltage signal is a signal obtained by greatly reducing the components of the first frequency band 114 as compared with the components of the second frequency band 115 in the time waveform $z_n(t)$ of the first drive voltage signal.

By the processes of STEP1 to STEP4 described above, the second drive voltage signals 109_1 to 109_N are calculated in the signal calculation unit 112.

When the second drive voltage signals 109_1 to 109_N are calculated by the signal calculation unit 112, the output unit 113 of the signal processing unit 105 drives the corresponding actuators 103_1 to 103_N with the second drive voltage signals 109_1 to 109_N, respectively.

The driven actuators 103_1 to 103_N vibrate the touch panel 101 at the respective attached positions, and the respective vibrations generated on the touch panel 101 propagate to each of the touch positions 106_1 to 106_M, so that tactile stimuli by the vibrations are presented.

At this time, when α=1 and ß=1, the time waveform $y_n(t)$ of the second drive voltage signal is equal to the time waveform $z_n(t)$ of the first drive voltage signal. Therefore, the vibration acceleration presented to the touch position 106_m (m=1 to M) has a time waveform substantially matching the time waveform $x_m(t)$ of the target vibration. Further, in the case of α<ß, $y_n(t)$ of the second drive voltage signal is a signal obtained by reducing the components of the first frequency band 114 of the time waveform $z_n(t)$ of the first drive voltage signal as compared to the components of the second frequency band 115. Therefore, the vibration acceleration presented at the touch position 106_m (m=1 to M) is a waveform obtained by similarly reducing the components of the first frequency band 114 of the time waveform $x_m(t)$ of the target vibration as compared to the components of the second frequency band 115.

<Action and Effect>

Actions and effects of the tactile sense presentation device 1 of Embodiment 1 will be described. First, for comparison, a configuration in which the first drive voltage signals 108_1 to 108_N are used for the second drive voltage signals 109_1 to 109_N will be considered. In this configuration, when the time waveform $z_n(t)$ (n=1 to N) of the first drive voltage signal exceeds a range of $-V_{max}$ to $+V_{max}$, saturation in the amplifier circuit or a non-linear operation of the actuator 103_n occurs, and not only intended vibration cannot be presented, but also a malfunction or a failure may be caused. Therefore, the time waveform $z_n(t)$ of the first drive voltage signal cannot be used as it is for the time waveform $y_n(t)$ of the second drive voltage signal.

Therefore, a configuration is considered in which the level of the time waveform $z_n(t)$ (n=1 to N) of the first drive voltage signal is lowered and this is used for the time waveform $y_n(t)$ of the second drive voltage signal. In this configuration, when the level of the time waveform $z_n(t)$ of the first drive voltage signal is lowered to fall within the range of $-V_{max}$ to $+V_{max}$ and is set as the time waveform $y_n(t)$ of the second drive voltage signal, it is possible to avoid a malfunction or a failure. However, the vibration to be presented is also the same level lower than the level of the time waveform $x_m(t)$ (m=1 to M) of the target vibration by the same amount, and only a tactile stimulus weaker than the intended tactile stimulus can be presented. For example, when the maximum voltage of the time waveform $z_n(t)$ of the first drive voltage signal is a value twice as large as $V_{max}$, a signal that is ½ times as large as $z_n(t)$ is set as the time waveform $y_n(t)$ of the second drive voltage signal, enabling the voltage to fall within the range of $-V_{max}$ to $+V_{max}$. However, the vibration to be presented at this time is a vibration having a magnitude that is ½ times $x_m(t)$.

In this regard, the tactile sense presentation device 1 of the present disclosure provides the following effects. First, the time waveform $x_m(t)$ of the target vibration as shown in FIG. 2 is a waveform generated by multiplying the sinusoidal wave of 200 Hz by the envelope waveform. The reason why such a waveform is used is that the waveform includes many components in the vicinity of 200 Hz, which are frequencies of vibrations with high tactile sensitivity, and thus it is easy to present a clear tactile stimulus to the user. However, since the waveform varies in a short period of time, the waveform includes components in a wide band other than the vicinity of 200 Hz, and also includes components of a band lower than 200 Hz.

Figure 5:
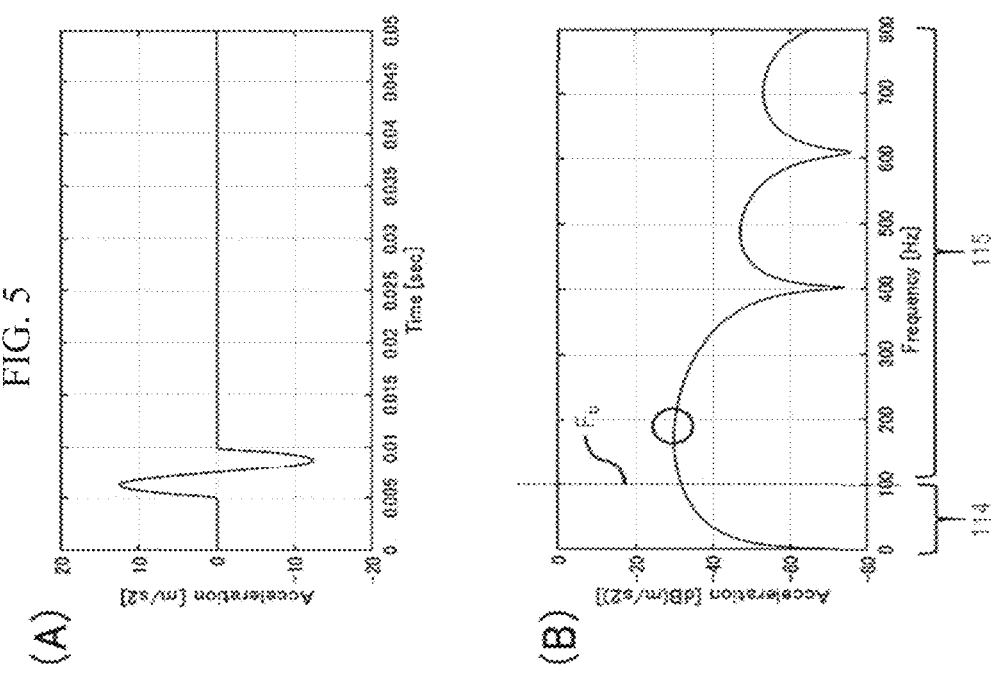
FIG. 5 is a graph showing an example of a target vibration according to Embodiment 1.

FIG. 5 includes graphs showing the target vibration 107_1 according to Embodiment 1, FIG. 5(A) shows a time waveform of the target vibration 107_1, and FIG. 5(B) shows a frequency characteristic thereof. FIG. 5(A) is a graph showing the same waveform as that of FIG. 2(A), although the scale of the horizontal axis is different. It can be seen that the target vibration 107_1 has a time waveform of one cycle of a sinusoidal wave having a frequency of 200 Hz, and has a frequency peak near 200 Hz, but also has a wide range of frequencies in other bands including the first frequency band 114.

Figure 6:
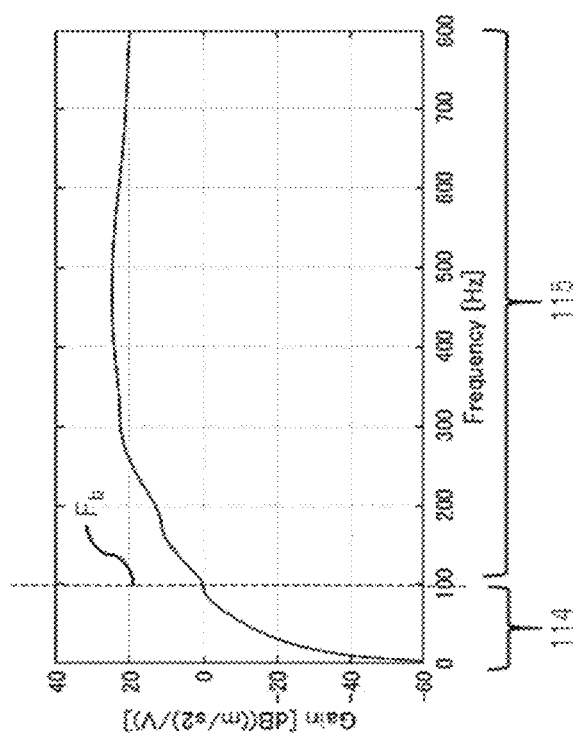
FIG. 6 is a graph showing an example of a frequency characteristic of vibration transfer characteristics in the tactile sense presentation device according to Embodiment 1.

On the other hand, it is generally known that the gain of vibration acceleration in a mechanical vibration system such as the touch panel 101 decreases by 12 dB for each ½ decrease in frequency on the lower side of the resonance frequency, and thus the lower the frequency, the more rapidly the gain decreases. FIG. 6 is a graph showing an example of a vibration transfer characteristic in the tactile sense presentation device 1. In a band lower than approximately 300 Hz, the gain decreases as the frequency is lower, and in particular, a steep decrease in the gain is observed in the first frequency band 114 lower than 100 Hz.

At this time, in order to accurately present the components of the first frequency band 114 included in the time waveform $x_m(t)$ (m=1 to M) of the target vibration, it is necessary to increase the components of the first frequency band 114 of the first drive voltage signals 108_1 to 108_N so as to compensate for the smallness of the gain of the mechanical vibration system. This is the reason why the first drive voltage signals 108_1 to 108_N are to be increased. In other words, in the first frequency band 114, the values of the elements of the matrix $[G_{mn}(f)]$ of the vibration transfer characteristic tend to decrease, and the values of the elements of the matrix $[H_{nm}(f)]$ having the inverse characteristic thereof increase to compensate for the decrease. Therefore, the first drive voltage signals 108_1 to 108_N calculated as the convolution of $[h_{nm}(t)]$ and $[x_m(t)]$, that is, the product of $[H_{nm}(f)]$ and $[X_m(f)]$, where $x_m(t)$ in the frequency domain corresponds to $X_m(f)$, also tend to have large values in the first frequency band 114.

Figure 7:
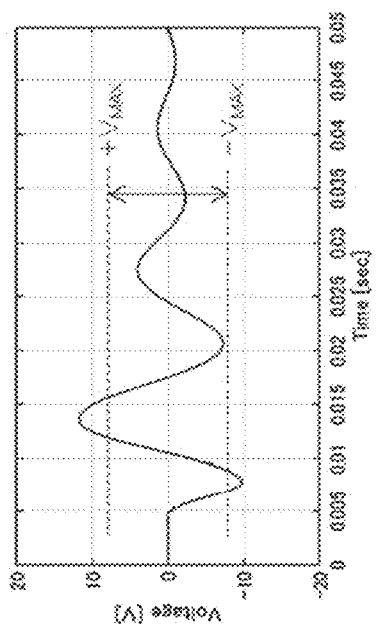
FIG. 7 is a graph showing an example of the first drive voltage signal according to Embodiment 1.
Figure 7:
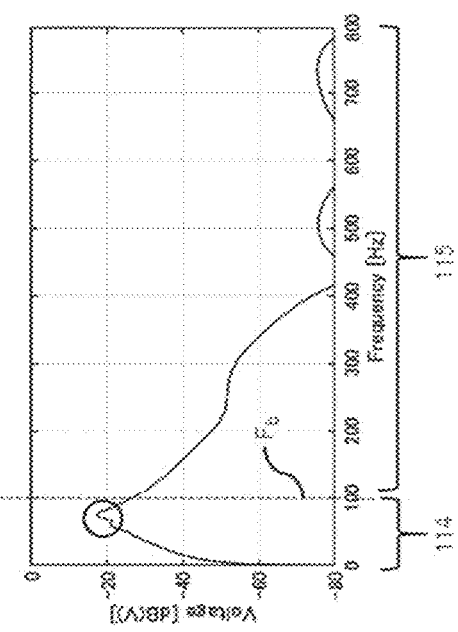

FIG. 7 is a graph showing the first drive voltage signal 108_1 according to Embodiment 1. FIG. 7(A) shows a time waveform of the first drive voltage signal 108_1 calculated by using the target vibration 107_1 shown in FIG. 5, and FIG. 7(B) shows a frequency characteristic thereof as an example. It can be seen that, although the target vibration 107_1 shown in FIG. 5(B) has a peak in the vicinity of 200 Hz, in the first drive voltage signal 108_1 shown in FIG. 7(B), a peak occurs at the frequency in the vicinity of 80 Hz in the first frequency band 114, which is lower than 200 Hz.

On the other hand, the frequency peak of the target vibration 107_1 exists in the vicinity of 200 Hz, and this band is also a band in which the tactile sensitivity to the vibration is high. Therefore, if there is no large change in the components of the target vibration in the vicinity of 200 Hz, the influence on the distortion generated in the vibration waveform and the tactile stimulation that is to be presented is small.

Therefore, in the tactile sense presentation device 1 of the present embodiment, the frequency $F_b$ is set to a frequency lower than the frequencies of the main components of the target vibrations 107_1 to 107_M, and the components of the second frequency band 115 higher than or equal to the frequency $F_b$ are held without being reduced as much as possible while the components of the first frequency band 114 lower than the frequency $F_b$ are preferentially reduced.

As a result, the main components of the target vibrations 107_1 to 107_M are included in the second frequency band 115, and an effect of suppressing the distortion occurring in the vibration waveform to be presented is obtained. At the same time, low-frequency components that tend to be large in the first drive voltage signals 108_1 to 108_N are included in the first frequency band 114, and by reducing the low-frequency components, an effect of efficiently suppressing the maximum voltage of the second drive voltage signals 109_1 to 109_N is obtained. At this time, in the target vibrations 107_1 to 107_M, the components of the first frequency band 114 are not the main components. Therefore, even if these components are reduced, the influence on the vibration waveform to be presented is small.

Figure 8:
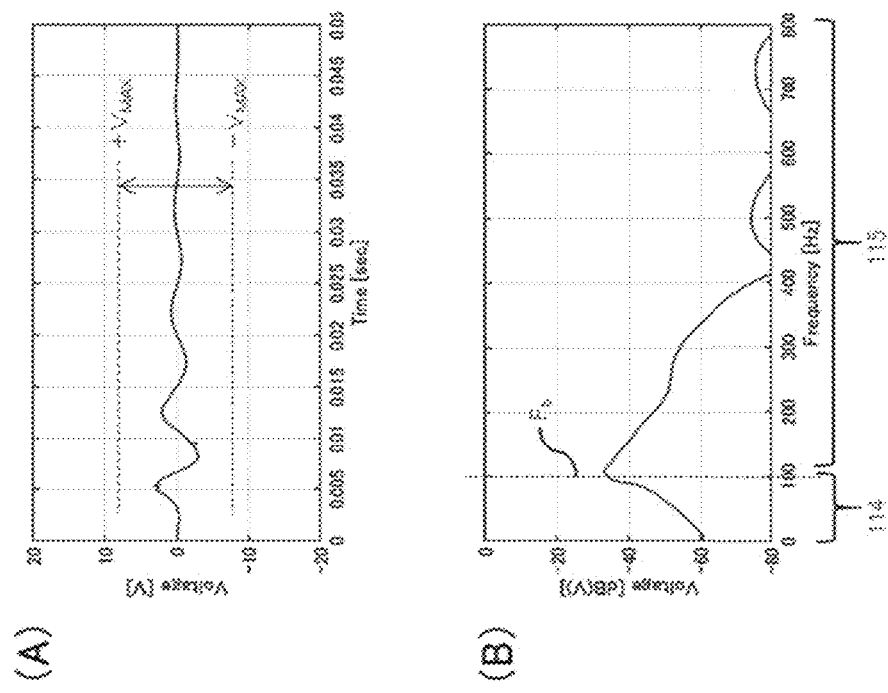
FIG. 8 is a graph showing an example of the second drive voltage signal according to Embodiment 1.

FIG. 8 is a graph showing the second drive voltage signal 109_1 according to Embodiment 1. FIG. 8(A) shows a time waveform of the second drive voltage signal 109_1 calculated by using the first drive voltage signal 108_1 shown in FIG. 7, and FIG. 8(B) shows a frequency characteristic thereof as an example.

When FIG. 7(B) is compared with FIG. 8(B), in the second drive voltage signal 109_1 according to the present embodiment, the components of the first frequency band 114 lower than 100 Hz set as the frequency $F_b$ are reduced. At this time, when FIG. 7(A) is compared with FIG. 8(A), the maximum voltage of the time waveform of the first drive voltage signal 108_1 is about 12 V, the maximum voltage of the time waveform of the second drive voltage signal 109_1 is about 3V, and it is found that the maximum voltage of the second drive voltage signal 109_1 is suppressed to be smaller than that of the first drive voltage signal 108_1. That is, by reducing the components of the first frequency band 114 of the first drive voltage signal 108_1, the maximum voltage of the time waveform of the second drive voltage signal 109_1 can be largely reduced.

Further, in FIG. 7(A) and FIG. 8(A), a drivable voltage range when the upper limit value $V_{max}$ of the voltage is 8 V is indicated. The first drive voltage signal 108_1 cannot be applied to the actuator 1031 because it is out of this voltage range, but the second drive voltage signal 109_1 can drive the actuator 103_1 because it is within this voltage range.

Figure 9:
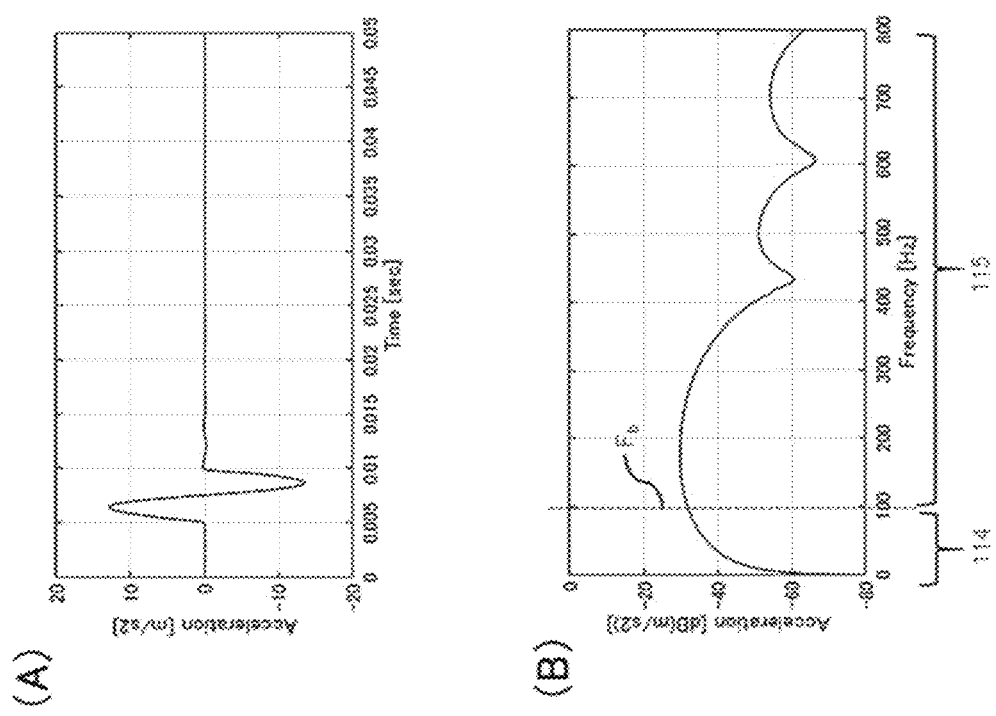
FIG. 9 is a graph showing an example of vibration presented at a touch position of a tactile sense presentation device according to a comparative example.

FIG. 9 includes graphs showing an example regarding the vibration to be presented to the touch position 106_1 of the tactile sense presentation device according to a comparative example. FIG. 9(A) shows an example of a time waveform of the vibration acceleration to be presented when the first drive voltage signal 108_1 shown in FIG. 7 is used, assuming that there is no upper limit of the voltage, and FIG. 9(B) shows a frequency characteristic thereof. When FIG. 9(A) is compared with FIG. 5(A), it can be seen that the waveform of the target vibration can be presented with high accuracy when the first drive voltage signal 108_1 is used.

Figure 10:
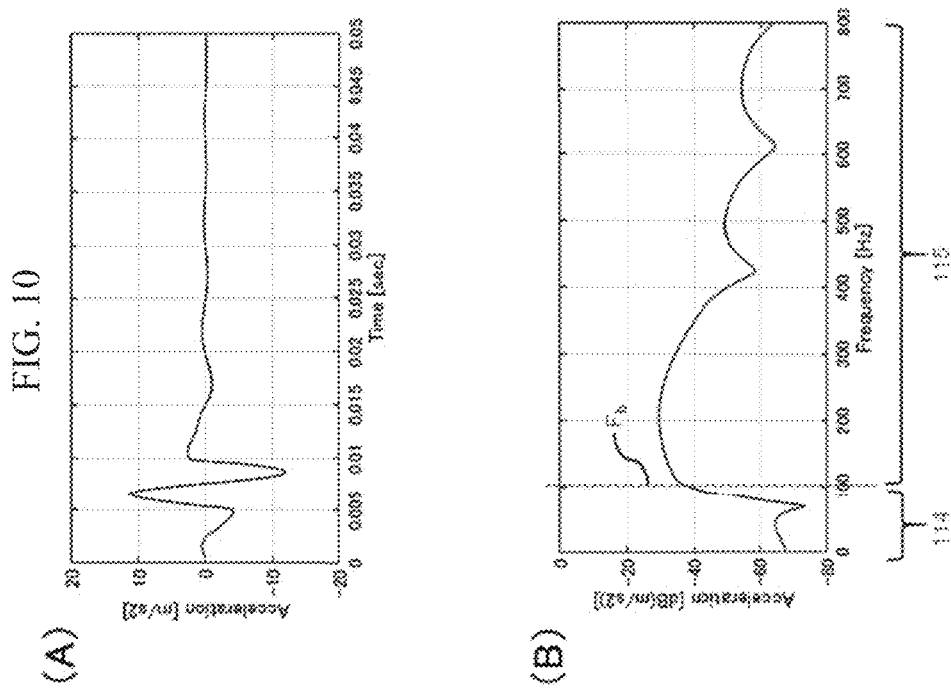
FIG. 10 is a graph showing an example of vibration presented at a touch position according to Embodiment 1.

FIG. 10 includes graphs showing an example regarding the vibration to be presented to the touch position 106_1 according to Embodiment 1. FIG. 10(A) shows a time waveform of the vibration acceleration to be presented when the second drive voltage signal 109_1 shown in FIG. 8 is used, and FIG. 10(B) shows a frequency characteristic thereof. In the frequency characteristic of the vibration acceleration of FIG. 10(B), components of the first frequency band 114, which is lower than the 100 Hz set as frequency $F_b$, are reduced as compared with FIG. 9(B).

Although the time waveform of the vibration acceleration shown in FIG. 10 (A) is slightly distorted as compared with the waveform $x_m(t)$ of the target vibration shown in FIG. 5 (A) and the waveform to be presented by the first drive voltage signal 108_1 shown in FIG. 9(A), the waveform is substantially the same, and the magnitude is also hardly changed. That is, the second drive voltage signal 109_1 has a time waveform in which the components of the first frequency band 114 of the first drive voltage signal 108_1 are reduced, but by holding the components of the second frequency band 115, it is possible to present the vibration equivalent to that when the first drive voltage signal 108_1 is used.

As described above, the tactile sense presentation device 1 of the present embodiment calculates the first drive voltage signals 108_1 to 108_N using the target vibrations 107_1 to 107_M preset corresponding to the touch positions 106_1 to 106_M and the vibration transfer characteristics up to the touch positions 106_1 to 106_M via the actuators 103_1 to 103_N, reduces the components of the first frequency band 114 less than the preset frequency $F_b$ in the first drive voltage signals 108_1 to 108_N, and calculates the second drive voltage signals 109_1 to 109_N within the preset voltage range ($-V_{max}$ to $+V_{max}$). This makes it possible to efficiently suppress the maximum voltage of the second drive voltage signals 109_1 to 109_N by reducing the components of the first frequency band 114 that tend to be large in the first drive voltage signals 108_1 to 108_N. At the same time, the components of the second frequency band 115, which are the main components of the target vibrations 107_1 to 107_M, are held in the second drive voltage signals 109_1 to 109_N, whereby the vibrations to be presented can be made close to the target vibrations 107_1 to 107_M. Therefore, it is possible to generate the vibration for presenting an appropriate tactile stimulus to the user within the preset voltage range ($-V_{max}$ to $+V_{max}$).

Further, the signal calculation unit 112 may calculate the second drive voltage signals 109_1 to 109_N within a preset voltage range ($-V_{max}$ to $+V_max$) by reducing the components of the second frequency band 115 not less than the preset frequency $F_b$ in the first drive voltage signals 108_1 to 108_N. In this case, the reduction ratio of the components of the first frequency band 114 of the first drive voltage signals 108_1 to 108_N is larger than the reduction ratio of the components of the second frequency band 115. As a result, it is possible to maintain the components of the second frequency band 115 that are important in the target vibrations 107_1 to 107_M, suppress the influence on the distortion generated in the vibration waveform and the tactile stimulus that are to be presented, and present a strong vibration stimulus as intended.

Note that when the time waveform $x_m(t)$ (m=1 to M) of the target vibration is a waveform obtained by multiplying a sinusoidal wave of the frequency $F_c$ by an envelope waveform, the time waveform $x_m(t)$ generally has a large frequency component near the frequency $F_c$, and the component of the frequency $F_c$ can be regarded as the main frequency component. Therefore, the frequency $F_b$ in this case may be set to a value lower than the frequency $F_c$. As a result, the second drive voltage signals 109_1 to 109_N hold the components of the second frequency band 115 in which the frequency peaks of the target vibrations 107_1 to 107_M are present more than the components of the first frequency band 114. Therefore, it is possible to suppress the influence on the distortion generated in the vibration waveform and the tactile stimulus that are to be presented and present a strong vibration stimulus as intended.

Further, in the present embodiment, the reason why the target vibrations 107_1 to 107_M are generated on the basis of the sinusoidal wave of the frequency of 200 Hz is that the tactile sensitivity of a finger is high with respect to a vibration in the vicinity of 200 Hz. The frequency of the sinusoidal wave to be used as the basis is not necessarily limited to 200 Hz. However, it is possible to transmit a clear tactile stimulus to a user by presenting a vibration including many high-frequency components where the tactile sensitivity is high. In consideration of the fact that the sensitivity of a human finger with respect to vibration acceleration is known to be high at frequencies equal to or lower than 300 Hz, and the gain of the mechanical vibration system decreases as the frequencies decrease, it is effective to use relatively high frequencies of 200 to 300 Hz for the vibration to be presented and to set the frequency $F_b$ to a frequency equal to or lower than 200 Hz, which is lower than those relatively high frequencies. Accordingly, it is possible to suppress the distortion of the vibration waveform to be presented also from a tactile sense viewpoint.

Further, in STEP3, the upper limit $V_{max}$ of the voltages (absolute values) that can be taken by the second drive voltage signals 109_1 to 109_N is set to the rated voltage value of the tactile sense presentation device 1 or the upper limit value of the voltages at which the actuators 103_1 to 103_N can be linearly driven, in order to prevent a malfunction or a failure of the tactile sense presentation device 1. When the second drive voltage signals 109_1 to 109_N exceed the rated voltage value or the upper limit value of the voltage at which the actuators 103_1 to 103_N can be linearly driven, saturation in the amplifier circuit or a nonlinear operation of the actuator occurs, and not only intended vibration cannot be presented, but also a malfunction or a failure may be caused. In view of this, $V_{max}$ is set to the rated voltage value of the tactile sense presentation device 1 or the upper limit value of the voltage at which the actuators 103_1 to 103_N can be linearly driven, and the second drive voltage signals 109_1 to 109_N are set to fall within the range of $-V_{max}$ to $+V_{max}$, whereby such a problem can be avoided.

In the procedure of determining the synthesis coefficients α and ß in STEP3, the synthesis coefficients α and ß are determined such that $\alpha z_{1n}(t)+ ß z_{2n}(t)$ falls within the range of $-V_{max}$ to $+V_{max}$ for all n: n=1 to N, and in STEP4, the time waveform $y_n(t)$ of the second drive voltage signal is calculated using the common synthesis coefficients α and ß for all n: n=1 to N.

Figure 11:
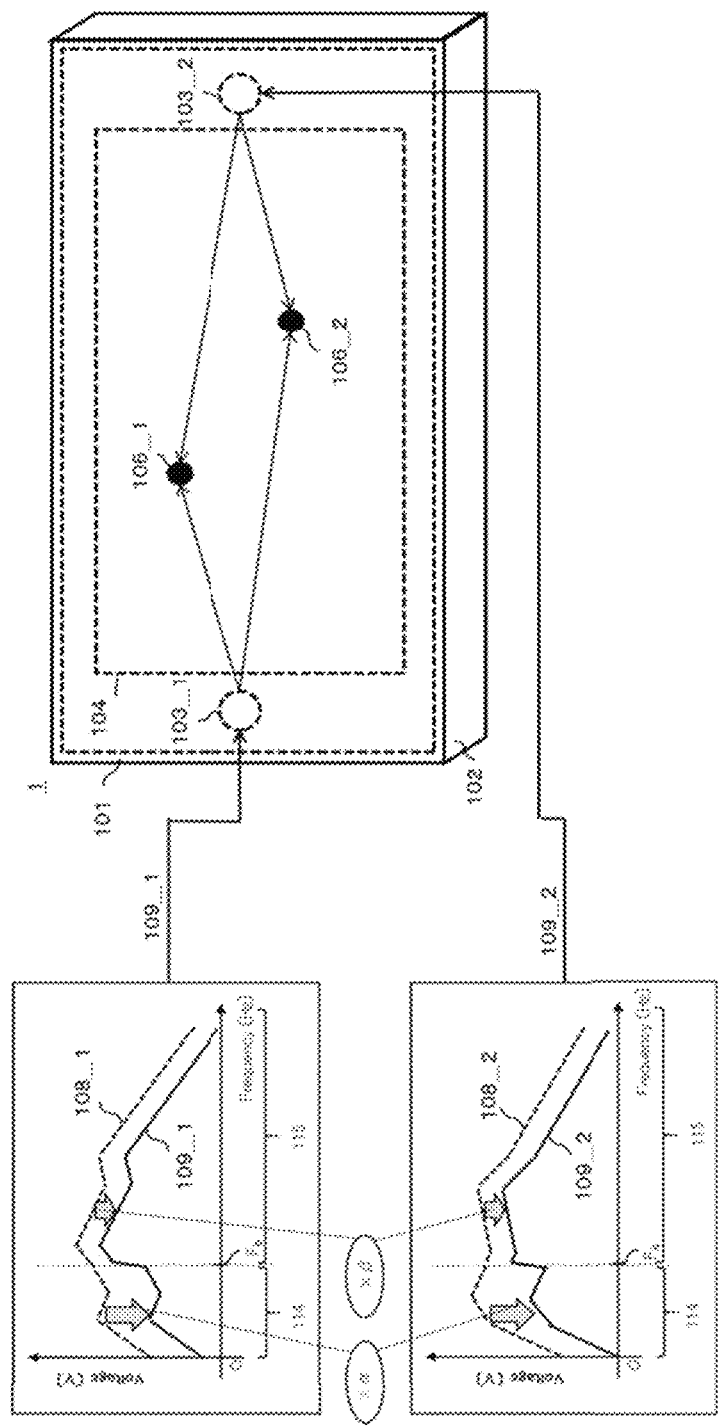
FIG. 11 is a schematic diagram for describing a relationship between the second drive voltage signals output to actuators according to Embodiment 1.

FIG. 11 is a schematic diagram illustrating a relationship between the second drive voltage signals 109_1 and 1092 output to the actuators 103_1 and 103_2 according to Embodiment 1. FIG. 11 illustrates a configuration with two actuators 103 as an example. The time waveforms $y_1(t)$ and $y_2(t)$ of the second drive voltage signals applied to the actuators 103_1 and 1032, respectively, are signals obtained by multiplying the components of the time waveforms $z_1(t)$ and $z_2(t)$ of the first drive voltage signals in the first frequency band 114 by a, and by multiplying the components of the time waveforms $z_1(t)$ and $z_2(t)$ of the first drive voltage signals in the second frequency band 115 by ß. That is, all of the second drive voltage signals 109_1 and 109_2 are calculated by reducing or amplifying the components of the first frequency band 114 and the second frequency band 115 at the same ratio in the corresponding respective first drive voltage signals 108_1 and 108_2.

In this way, the reason why the common synthesis coefficients α and ß are used for all n: n=1 to N, is as follows. When the plurality of actuators 103_1 to 103_N are provided, the vibration generated at each of the touch positions 106_1 to 106_M is the superposition of the vibrations propagated from the actuators 103_1 to 103_N. At this time, the first drive voltage signals 108_1 to 108_N calculated on the basis of the transfer characteristics so as to present the target vibrations 107_1 to 107_M to the touch positions 106_1 to 106_M form desired vibrations by the balance of the vibrations propagated from the actuators 103_1 to 103_N, for example, such that the vibration from a certain actuator 103_n and the vibration from another actuator 103_p (p≠n) cancel each other, etc. Thus, if only any of the first drive voltage signals, that is, the first drive voltage signal 108_n of the actuator 103_n, is reduced or amplified, unintended vibration may remain.

On the other hand, when the common synthesis coefficients α and ß are used, the time waveforms $y_n(t)$ of all the second drive voltage signals: n=1 to N, are signals obtained evenly by multiplying the components of the first frequency band 114 by α and multiplying the components of the second frequency band 115 by ß in the time waveform $z_n(t)$ of the first drive voltage signal in the same way. Therefore, the waveforms of the vibration acceleration to be presented at the touch positions 106_1 to 106_M are waveforms obtained by multiplying the components of the first frequency band 114 by α and multiplying the components of the second frequency band 115 by ß in the time waveform $x_m(t)$ of the target vibration. Thus, unintended vibrations are not generated. Therefore, by reducing or amplifying the first drive voltage signals 108_1 to 108_N for all the actuators 103_1 to 103_N at the same ratio using the common synthesis coefficients α and ß for calculating the time waveform $y_n(t)$ of the second drive voltage signal so as not to change the ratio of superposition of the vibrations from the actuators 103_1 to 103_N, there is an effect of preventing the occurrence of unintended vibrations.

Further, considering that the first drive voltage signals 108_1 to 108_N are increased because the gain of the vibration acceleration of the mechanical vibration system constituted by the touch panel 101 and the support portion with the housing 102 is small in the low frequency range, the effect of the present disclosure is remarkably exhibited in the mechanical vibration system in which the gain of the vibration acceleration in the first frequency band 114 is lower than the gain thereof at the frequency of the main component of the target vibration 107. Such a frequency characteristic of the gain is likely to be obtained when all the resonance frequencies of the mechanical vibration system are included in the second frequency band 115. Therefore, it is desirable that the mechanical vibration system including the touch panel 101 and the supporting portion with the housing 102 is configured such that all the resonance frequencies thereof are included in the second frequency band 115. Since the resonance frequency of the mechanical vibration system is determined by its weight, rigidity, shape, and the like, the tactile sense presentation device 1 having a desired resonance frequency can be obtained by appropriately designing the material and dimensions of the touch panel 101 and the support portion of the housing 102.

Variation 1 of Embodiment 1

As Variation 1 of Embodiment 1, a configuration in which a procedure for determining the synthesis coefficients α and ß is different from that in STEP3 will be described.

<Configuration and Operation>

In Variation 1 of Embodiment 1, the signal calculation unit 112 determines the synthesis coefficients α and ß such that a is smaller than 1 (however, α is equal to or larger than 0) and ß is larger than 1 under the condition that $\alpha z_{1n}(t)+ ß z_{2n}(t)$ falls within the range of $-V_{max}$ to $+V_{max}$ for all n: n=1 to N.

Figure 12:
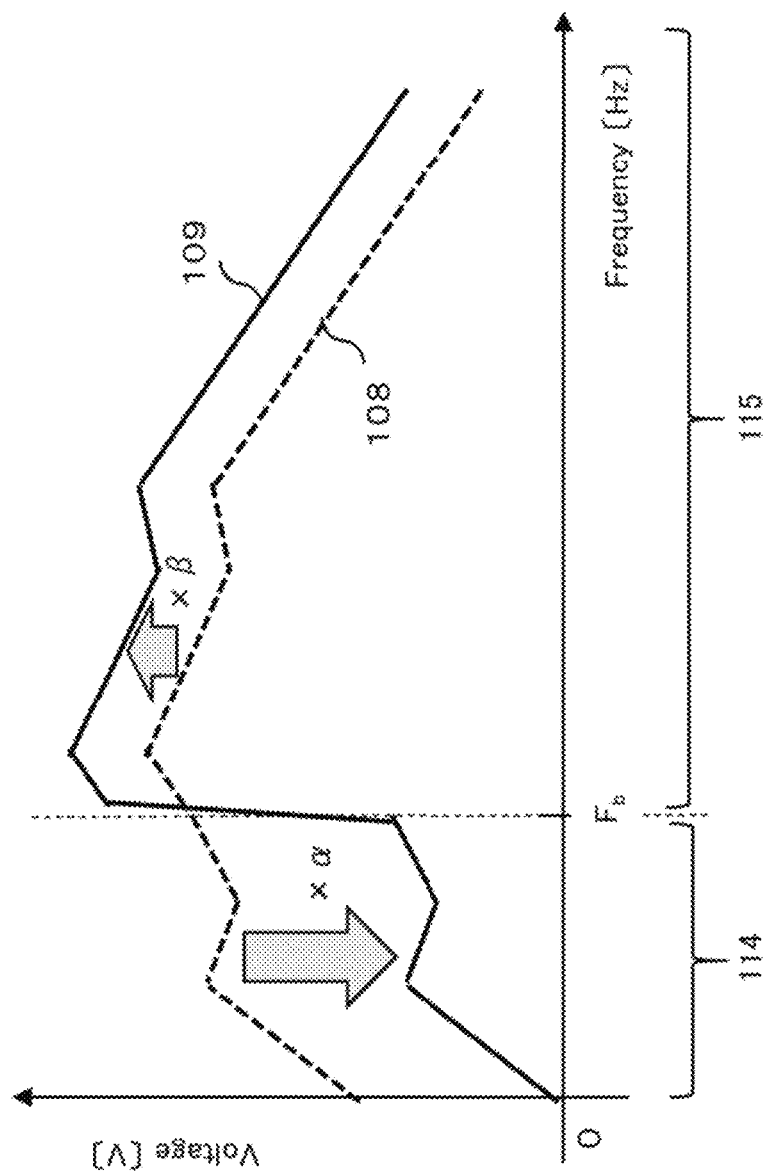
FIG. 12 is a graph showing the relationship between the frequency characteristics of the first drive voltage signal 108 and the second drive voltage signal 109 in Variation 1 of Embodiment 1.

FIG. 12 is a graph showing the relationship between the frequency characteristics of the first drive voltage signal 108 and the second drive voltage signal 109 in Variation 1 of Embodiment 1. The graph shows the relationship of the frequency characteristics when time waveforms are the time waveforms $z_n(t)$ (n=1 to N) of the first drive voltage signal and the time waveform $y_n(t)$ of the second drive voltage signal corresponding thereto. The broken line graph shows the frequency characteristic of the time waveform $z_n(t)$ of the first drive voltage signal, and the solid line graph shows the frequency characteristic of the time waveform $y_n(t)$ of the second drive voltage signal. The time waveform $y_n(t)$ of the second drive voltage signal is a signal obtained by multiplying the components of the time waveform $z_n(t)$ of the first drive voltage signal in the first frequency band 114 by α and multiplying the components of the time waveform $z_n(t)$ of the first drive voltage signal in the second frequency band 115 by ß. Since α<1 and 1<ß, the time waveform $y_n(t)$ of the second drive voltage signal becomes a signal in which the components of the first frequency band 114 are reduced and the components of the second frequency band 115 are amplified in the time waveform $z_n(t)$ of the first drive voltage signal.

Hereinafter, an example of a specific procedure for determining the synthesis coefficients α and ß will be described. First, the signal calculation unit 112 sets α=1 and ß=1 and calculates a time waveform $yy_n(t)=\alpha z_{1n}(t)+\beta z_{2n}(t)$ as a provisional second drive voltage signal. If $yy_n(t)$ is within the range of $-V_{max}$ to $+V_{max}$ for all n: n=1 to N, then α=1 and ß=1 are set.

If the time waveform $yy_n(t)$ of the provisional second drive voltage signal does not fall within the range of $-V_{max}$ to $+V_{max}$, the signal calculation unit 112 calculates $yy_n(t)=\alpha z_{1n}(t)+\beta z_{2n}(t)$ with α=0 and ß=1.

When the time waveform $yy_n(t)$ of the provisional second drive voltage signal does not fall within the range of $-V_{max}$ to $+V_{max}$ at any n: n=1 to N, the signal calculation unit 112 decreases ß from 1 while keeping α at 0, and adopts the value of ß when the time waveform $yy_n(t)$ of the provisional second drive voltage signal falls within the range of $-V_{max}$ to $+V_{max}$ at all n: n=1 to N.

When the time waveform $yy_n(t)$ of the provisional second drive voltage signal falls within the range of $-V_{max}$ to $+V_{max}$ at all n: n=1 to N, the signal calculation unit 112 increases ß from 1 while keeping α at 0, and adopts the value of ß at which Expression (3) is minimized in the range satisfying Condition 1.

Condition 1: $yy_n(t)=\alpha z_{1n}(t)+\beta z_{2n}(t)$ falls within the range of $-V_{max}$ to $+V_{max}$ for all n: n=1 to N.

$$\sum_{m=1}^{M} |PP(xx_m(t)) - PP(x_m(t))| \quad (3)$$

Here, |A| represents the absolute value of A, and PP(B(t)) represents the peak-to-peak value of a time waveform B(t), which indicates the difference between the maximum value (positive value) and the minimum value (negative value) of the waveform. Further, $xx_m(t)$ is a time waveform calculated as $xx_m(t)=\alpha x_{1m}(t)+\beta x_{2m}(t)$. Here, $x_{1m}(t)$ is a time waveform of components of the first frequency band 114 separated from the time waveform $x_m(t)$ of the target vibration and is calculated by convolving $x_m(t)$ with the first separation filter $w_1(t)$. Further, $x_{2m}(t)$ is a time waveform of components of the second frequency band 115 separated from the time waveform $x_m(t)$ of the target vibration and is calculated by convolving $x_m(t)$ with the second separation filter $w_2(t)$.

Since the first drive voltage signal 108 when $x_m(t)$ (m=1 to M) is the target vibration 107 is $z_n(t)$ (n=1 to N), $xx_m(t)$ (m=1 to M) calculated as $xx_m(t)=\alpha x_{1m}(t)+\beta x_{2m}(t)$ corresponds to the target vibration 107 when the second drive voltage signal 109 is $yy_n(t)=\alpha z_{1n}(t)+\beta z_{2n}(t)$ (n=1 to N). That is, $xx_m(t)$ (m=1 to M) represent vibration waveforms expected to be generated at the touch positions 106_1 to 106_M when the provisional second drive voltage signal $yy_n(t)=\alpha z_{1n}(t)+\beta z_{2n}(t)$ obtained in the present variation is applied to the actuators 103_$n$ (n=1 to N).

In the above-described procedure, ß is increased from 1 with α=0 being kept, and α and ß that minimize Expression (3) are calculated. However, even when α is not set to 0, α can be set to a value larger than 0 in a case where Condition 1 can be satisfied. That is, in a case where Condition 1 is satisfied when $\alpha=\alpha_0$ ($\alpha_0$ is a constant larger than 0) and ß=1, ß is increased from 1 with $\alpha=\alpha_0$ being kept, and α and ß that minimize Expression (3) can also be calculated. The synthesis coefficients α and ß are determined by the above procedure.

<Action and Effect>

Figure 13:
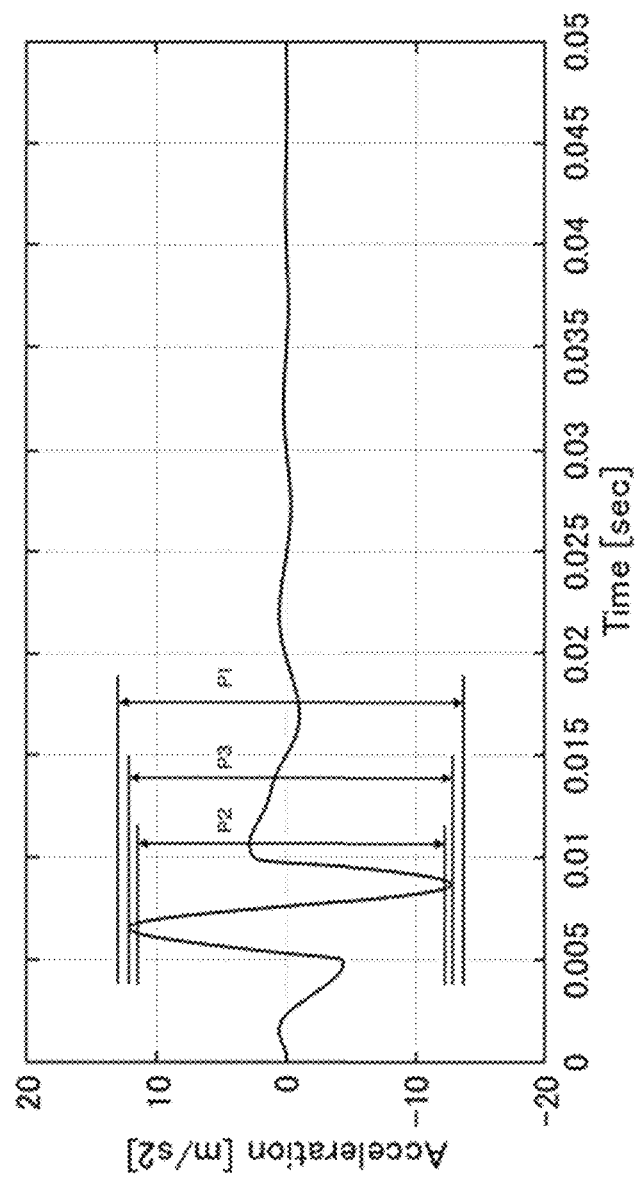
FIG. 13 is a graph showing an example of vibration presented at a touch position 106 according to Variation 1 of Embodiment 1.

FIG. 13 is a graph showing an example of a vibration to be presented to the touch position 106 according to Variation 1 of Embodiment 1. FIG. 13 is a graph showing an example of a time waveform of the vibration to be presented to the touch position 106, where the vertical axis represents vibration acceleration (m/s$^2$) and the horizontal axis represents time t (sec). The vibration shown in FIG. 13 is a vibration presented to the touch position 106 when the second drive voltage signal 109 calculated by using the first drive voltage signal 108 shown in FIG. 7 and the synthesis coefficients α and ß determined by STEP3 of Variation 1 of Embodiment 1 is output to the actuators 103. P1 in FIG. 13 indicates the peak-to-peak value of the time waveform of the target vibration shown in FIG. 5(A), P2 indicates the peak-to-peak value of the time waveform of the vibration presented at the touch position 106 in Embodiment 1 shown in FIG. 10(A), and P3 indicates the peak-to-peak value of the time waveform of the vibration presented at the touch position 106 in Variation 1 of Embodiment 1.

Even if the components of the second frequency band 115 of the target vibration 107 are accurately presented, the peak-to-peak value of the time waveform of the vibration to be presented is determined by the superposition of the time waveform of the components of the first frequency band 114 and the time waveform of the components of the second frequency band 115 at each time. Therefore, the peak-to-peak value is not necessarily the same as the peak-to-peak value of the target vibration 107 due to the lack of the components of the first frequency band 114.

For example, when the time waveform of the target vibration shown in FIG. 5(A) is compared with the time waveform of the vibration presented at the touch position 106 in Embodiment 1 shown in FIG. 10(A), it can be seen that although substantially the same time waveform is obtained, the peak-to-peak value P2 is slightly smaller than the peak-to-peak value P1 in the peak-to-peak values shown in FIG. 13.

When the peak-to-peak value decreases, even if the magnitude of the components of the second frequency band 115 is maintained, the tactile stimulus at the moment when the peak of the vibration is reached may be felt to be weak. Therefore, it is desirable to present the same peak-to-peak value as the target vibration 107.

In this regard, in Variation 1 of Embodiment 1, the synthesis coefficient ß is set to be larger than 1 when the synthesis coefficient ß can be made larger than 1 in the range in which the second drive voltage signal 109 falls within the range from $-V_{max}$ to $+V_{max}$. That is, the peak-to-peak value P3 is increased by amplifying the components of the first drive voltage signal 108 in the second frequency band 115 that are greater than or equal to the preset frequency $F_b$, so that it is possible to generate a vibration that presents an appropriate tactile stimulus to a user within the preset voltage range.

Further, Expression (3) represents a difference between the peak-to-peak value of the vibration waveform presented by $yy_n(t)$ (n=1 to N) and the peak-to-peak value of the target vibration 107. By minimizing this difference, the peak-to-peak value of the vibration to be presented can be brought as close as possible to the peak-to-peak value of the target vibration 107.

Note that the reason why Expression (3) is a value obtained by summing the differences between the peak-to-peak values over m: m=1 to M is that, when M is equal to or greater than 2, the peak-to-peak values cannot be made equal to the target vibration 107 at the same time for all m. Even in a case where M is equal to or greater than 2, by calculating the difference between the peak-to-peak values in each of m: m=1 to M and minimizing the sum thereof as in Expression (3), it is possible to present vibration that is as close as possible to the peak-to-peak value of the target vibration 107 as a whole.

Variation 2 of Embodiment 1

As Variation 2 of Embodiment 1, a configuration in which the setting of the upper limit value $V_{max}$ of the voltages (absolute values) that can be taken by the second drive voltage signal 109 in STEP3 is different will be described.

<Configuration and Operation>

In Variation 2 of Embodiment 1, the setting of $V_{max}$ can be changed in accordance with the operation mode of the tactile sense presentation device 1, and when the energy saving mode is set, $V_{max}$ is set to a value smaller than the rated voltage value of the tactile sense presentation device 1 or the upper limit value of the voltage at which the actuator 103 can be linearly driven.

<Action and Effect>

By setting the upper limit value $V_{max}$ to a value smaller than the rated voltage value or the upper limit value of the voltage at which the actuator 103 can be linearly driven, the vibration stimulus that can be presented is weakened, but not only the malfunction or the failure can be avoided, but also the power consumption of the tactile sense presentation device 1 can be saved.

Further, by changing the setting of $V_{max}$ in accordance with the operation mode of the tactile sense presentation device 1, it is possible to switch between a normal mode in which a strong vibration stimulus can be presented although the power consumption is large and an energy saving mode in which a long time operation can be performed by saving the power consumption although the vibration stimulus to be presented is weak, depending on the charge amount of the battery at the time of use. That is, when the charge amount of the battery is large, a vibration to present an appropriate tactile stimulus to a user is generated by a strong vibration stimulus within a voltage range set in advance, and when the charge amount is small, power consumption is suppressed to enable long-time use.

Variation 3 of Embodiment 1

As Variation 3 of Embodiment 1, a configuration in which the method of determining the frequency $F_b$ in STEP2 is different will be described.

<Configuration and Operation>

In Variation 3 of Embodiment 1, frequencies at which the frequency characteristics of the target vibrations 107_1 to 107_M exhibit peaks are calculated, and a frequency lower than the peak frequencies is set as the frequency $F_b$. That is, in a case where M is two or more and there are a plurality of target vibrations 107_1 to 107_M, the respective peak frequencies are calculated, and a frequency lower than any of the peak frequencies is set. In addition, when a time waveform having a value of 0 at all times is included in any of the target vibrations 107_1 to 107_M, the time waveform is excluded.

<Action and Effect>

Since the main components of the target vibrations 107_1 to 107_M can be regarded as the largest components in the frequency characteristics thereof, that is, the peak components of the frequency characteristics, the frequency $F_b$ may be set to a frequency lower than the peak frequencies of the target vibrations 107_1 to 107_M. That is, if the peak component of the frequency characteristic is greatly reduced, distortion generated in the vibration waveform to be presented increases. However, by setting the frequency $F_b$ to a frequency lower than the peak frequencies of the target vibrations 107_1 to 107_M, the peak components of the frequency characteristics of the target vibrations 107_1 to 107_M can be included in the second frequency band 115, and the distortion of the waveform to be presented can be suppressed. Further, according to the method of the present variation, even when the target vibrations 107_1 to 107_M do not have waveforms obtained by multiplying a sinusoidal wave having a predetermined frequency by an envelope waveform, the frequencies of the main components thereof can be determined and the frequency $F_b$ can be set.

That is, when M is two or more and there are the plurality of target vibrations 107_1 to 107_M, the respective peak frequencies are calculated, and the frequency $F_b$ is set to a frequency lower than any of the peak frequencies. Thus, it is possible to suppress distortion of all vibration waveforms to be presented at the touch positions 106_1 to 106_M. However, when any of the target vibrations 107_1 to 107_M is a time waveform having a value of 0 at all times, $F_b$ may be selected by excluding the waveform. The reason is that the time waveform having a value of 0 at all times remains to have a value of 0 at all times even if any of the band components is reduced, and no distortion occurs in the waveform.

Variation 4 of Embodiment 1

As Variation 4 of Embodiment 1, another configuration in which the method of determining the frequency $F_b$ in STEP2 is different will be described.

<Configuration and Operation>

In Variation 4 of Embodiment 1, when the time waveform $z_n(t)$ (n=1 to N) of the first drive voltage signal has a peak at a frequency lower than the frequencies of the main components of the target vibrations 107_1 to 107_M, the frequency $F_b$ is set to a frequency higher than the peak frequency of the frequency characteristic of the time waveform $z_n(t)$ (n=1 to N) of the first drive voltage signal. In addition, in a case where N is equal to or greater than 2 and there are a plurality of time waveforms $z_n(t)$ (n=1 to N) of the first drive voltage signals, each peak frequency is calculated and the frequency $F_b$ is set to a frequency higher than any of the peak frequencies.

<Action and Effect>

By setting the frequency $F_b$ to a frequency higher than the peak frequency of the frequency characteristic of the time waveform $z_n(t)$ (n=1 to N) of the first drive voltage signal, the component of the frequency peak of the time waveform $z_n(t)$ of the first drive voltage signal can be included in the first frequency band 114, and the second drive voltage signals 109_1 to N can be efficiently reduced. As described above, the gain of the vibration acceleration in the mechanical vibration system such as the touch panel 101 sharply decreases as the frequency decreases and the time waveform $z_n(t)$ of the first drive voltage signal is likely to have a peak at a frequency lower than the frequencies of the main components of the target vibrations 107_1 to 107_M. In order to reduce the second drive voltage signals 109_1 to 109_N, it is effective to reduce the components that correspond to the frequency peaks of the first drive voltage signals 108_1 to 108_N. If the frequency peaks are in a lower range than the main frequency components of the target vibrations 107_1 to 107_M, the influence on the vibration waveforms to be presented is small even if the components are reduced. It is effective to set the frequency $F_b$ lower than the frequencies of the main components of the target vibrations 107_1 to 107_M and higher than the frequency of the main component of the time waveform $z_n(t)$ of the first drive voltage signal.

In addition, when N is two or more and there are the plurality of time waveforms $z_n(t)$ (n=1 to N) of the first drive voltage signals, by calculating each peak frequency and setting the frequency $F_b$ to a frequency higher than any of the peak frequencies, it is possible to suppress the maximum voltages of all the second drive voltage signals 109_1 to 109_N applied to the actuators 103_1 to 103_N.

DESCRIPTION OF REFERENCE NUMERALS AND SIGNS

1: tactile sense presentation device, 101: touch panel, 102: housing, 103: actuator, 104: touch sensor, 105: signal processing unit, 106: touch position, 107: target vibration, 108: first drive voltage signal, 109: second drive voltage signal, 111: input unit, 112: signal calculation unit, 113: output unit, 114 first frequency band, 115 second frequency band

The invention claimed is:

1. A tactile sense presentation device comprising:
a touch panel;
a housing that supports the touch panel;
an actuator that is installed on the touch panel and vibrates the touch panel;
a touch sensor that detects a touch position on the touch panel;
signal calculation circuitry that calculates a first drive voltage signal using a target vibration preset to correspond to the touch position and a vibration transfer characteristic up to the touch position through the actuator, sets the first drive voltage signal as a second drive voltage signal when the first drive voltage signal is within a preset voltage range, and reduces components of a first frequency band of the calculated first drive voltage signal less than a preset frequency to calculate the second drive voltage signal within the preset voltage range when the first drive voltage signal exceeds the preset voltage range; and
output circuitry that outputs the second drive voltage signal to the actuator.

2. The tactile sense presentation device according to claim 1, wherein the signal calculation circuitry calculates the second drive voltage signal within the preset voltage range by reducing, amplifying, or maintaining components of a second frequency band of the first drive voltage signal equal to or higher than the preset frequency when the first drive voltage signal exceeds the preset voltage range, and a reduction ratio of the components of the first frequency band is larger than a reduction ratio of the components of the second frequency band when the components of the second frequency band of the first drive voltage signal are reduced.

3. The tactile sense presentation device according to claim 2, wherein a plurality of the actuators are provided, and when a plurality of the first drive voltage signals corresponding to the respective plurality of actuators are calculated, the signal calculation circuitry calculates a plurality of the second drive voltage signals by reducing components of the first frequency band of the plurality of the first drive voltage signals at the same ratio and reducing or amplifying components of the second frequency band of the plurality of the first drive voltage signals at the same ratio or maintaining the components of the second frequency band.

4. The tactile sense presentation device according to claim 3, wherein the preset frequency is a frequency lower than a frequency at which a frequency characteristic of the target vibration exhibits a peak.

5. The tactile sense presentation device according to claim 4, wherein when a plurality of the touch positions are detected by the touch sensor and there are a plurality types of the target vibrations corresponding to the plurality of the touch positions, the preset frequency is a frequency lower than any of frequencies at which the frequency characteristics of the target vibrations except for a target vibration having a time waveform with a magnitude of 0 exhibit peaks.

6. The tactile sense presentation device according to claim 5, wherein the preset frequency is a frequency higher than a frequency at which a frequency characteristic of the first drive voltage signal exhibits a peak.

7. The tactile sense presentation device according to claim 6, wherein a plurality of the actuators are provided, and when a plurality of the first drive voltage signals corresponding to the respective plurality of actuators are calculated in the signal calculation circuitry, the preset frequency is a frequency higher than any of frequencies at which the frequency characteristics of a plurality of the first drive voltage signals exhibit peaks.

8. The tactile sense presentation device according to claim 4, wherein the preset frequency is a frequency higher than a frequency at which a frequency characteristic of the first drive voltage signal exhibits a peak.

9. The tactile sense presentation device according to claim 8, wherein a plurality of the actuators are provided, and when a plurality of the first drive voltage signals corresponding to the respective plurality of actuators are calculated in the signal calculation circuitry, the preset frequency is a frequency higher than any of frequencies at which the frequency characteristics of a plurality of the first drive voltage signals exhibit peaks.

10. The tactile sense presentation device according to claim 3, wherein a time waveform of the target vibration is a waveform obtained by multiplying a sinusoidal wave of a predetermined frequency by an envelope waveform, and the preset frequency is a frequency lower than the predetermined frequency of the sinusoidal wave.

11. The tactile sense presentation device according to claim 10, wherein the preset frequency is a frequency higher than a frequency at which a frequency characteristic of the first drive voltage signal exhibits a peak.

12. The tactile sense presentation device according to claim 11, wherein a plurality of the actuators are provided, and when a plurality of the first drive voltage signals corresponding to the respective plurality of actuators are calculated in the signal calculation circuitry, the preset frequency is a frequency higher than any of frequencies at which the frequency characteristics of a plurality of the first drive voltage signals exhibit peaks.

13. The tactile sense presentation device according to claim 1, wherein the preset frequency is equal to or lower than 200 Hz.

14. The tactile sense presentation device according to claim 1, wherein the preset voltage range is a voltage range in which the actuator can be linearly driven or a rated voltage range of the tactile sense presentation device.

15. The tactile sense presentation device according to claim 14, wherein the preset voltage range can be changed depending on an operation mode of the tactile sense presentation device, and when the operation mode is set to an energy saving mode, the preset voltage range is set to a voltage range narrower than the voltage range in which the actuator can be linearly driven or the rated voltage range of the tactile sense presentation device.

16. A tactile sense presentation method comprising:
   detecting a touch position on a touch panel;
   calculating a first drive voltage signal by using a target vibration preset to correspond to the detected touch position and a vibration transfer characteristic up to the touch position through an actuator;
   setting the first drive voltage signal as a second drive voltage signal when the first drive voltage signal is within a preset voltage range, and calculating the second drive voltage signal within the preset voltage range by reducing components of a first frequency band of the first drive voltage signal less than a preset frequency when the first drive voltage signal exceeds the preset voltage range; and
   outputting the second drive voltage signal to the actuator.

* * * * *